(12) United States Patent
Sharron

(10) Patent No.: US 8,701,711 B2
(45) Date of Patent: Apr. 22, 2014

(54) CONTINUOUSLY ADJUSTABLE, MULTI-PORT SELECTION, CONSTANT FLOW CAPABILITY, EXTERNALLY-ACTUATED ROTARY FLOW VALVE APPARATUS, SYSTEM AND METHOD

(76) Inventor: Daniel Sharron, Schenectady, NY (US)

( * ) Notice: Subject to any disclaimer, the term of this patent is extended or adjusted under 35 U.S.C. 154(b) by 519 days.

(21) Appl. No.: 13/158,532

(22) Filed: Jun. 13, 2011

(65) Prior Publication Data

US 2011/0253223 A1    Oct. 20, 2011

(51) Int. Cl.
*F16K 11/02*    (2006.01)

(52) U.S. Cl.
USPC .................. 137/625.15; 251/344; 251/345

(58) Field of Classification Search
USPC ............. 137/625.12, 625.13, 625.14, 625.15, 137/625.46, 874; 251/344, 345
See application file for complete search history.

(56) References Cited

U.S. PATENT DOCUMENTS

| | | | |
|---|---|---|---|
| 486,722 A * | 11/1892 | Loss | 137/625.33 |
| 593,730 A | 11/1897 | Stoddard | |
| 2,534,046 A | 12/1950 | Mau | |
| RE24,055 E | 8/1955 | Daniels | |
| 2,736,339 A | 2/1956 | Asbury | |
| 3,005,468 A * | 10/1961 | Erwin et al. | 137/625.31 |
| 3,104,674 A | 9/1963 | Bills | |
| 3,124,162 A | 3/1964 | Cameron | |
| 3,135,293 A * | 6/1964 | Hulsey | 137/625.31 |
| 3,202,180 A * | 8/1965 | Gray | 137/625.15 |
| 3,334,861 A | 8/1967 | Westbrook | |
| 3,369,565 A | 2/1968 | Haggard | |
| 3,460,574 A | 8/1969 | Risher | |
| 3,538,953 A | 11/1970 | Berger | |
| 3,768,516 A | 10/1973 | Cyphelly | |
| 3,837,360 A | 9/1974 | Bubula | |
| 4,148,460 A | 4/1979 | Kinsler | |
| 4,371,003 A | 2/1983 | Goguen | |
| 4,448,214 A | 5/1984 | D'Alessio | |
| 4,614,205 A * | 9/1986 | Oroskar | 137/625.11 |
| 5,118,418 A | 6/1992 | Roussel | |
| 5,123,449 A | 6/1992 | Nowicki | |
| 5,704,588 A | 1/1998 | Korfgen et al. | |
| 6,161,583 A | 12/2000 | Morris | |
| 6,880,802 B2 | 4/2005 | Hara et al. | |
| 6,932,112 B2 | 8/2005 | Bradford et al. | |
| 6,997,213 B1 | 2/2006 | Towler et al. | |
| 2010/0032603 A1 | 2/2010 | Wilen | |
| 2010/0058841 A1 | 3/2010 | Wilen | |

\* cited by examiner

*Primary Examiner* — John Fox
(74) *Attorney, Agent, or Firm* — Jay R. Yablon

(57) ABSTRACT

A rotary flow valve apparatus and associated systems and methods, comprising: a front plate (11) comprising a plurality of fluid entry ports (14) running therethrough; a rear plate (12) comprising one central fluid exit port (30) running through a substantial center thereof and P peripheral fluid exit ports (31-36) running through a substantially circumferential periphery thereof; P flow selector bars (91) integrally connecting the front plate (11) with the rear plate (12) and fixing the front plate relative to the rear plate; P inter-bar flow channels (92) defined between rotationally-adjacent pairs of the flow selector bars (91); and a selector cylinder (13) seated over and freely and continuously rotatable around the flow selector bars and relative to the front and rear plates.

There are twice as many entry ports (14) as peripheral exit ports (31-36). When peripheral flow channel (62) aligns with two such ports, flow to central exit port (30) is blocked by a selector bar (91) and fluid exits only through the selected peripheral exit port. When the peripheral flow channel (62) aligns with a blank on plate (12) radially aligned with a flow channel (92), flow is allowed through channel (92) and fluid exits only through the central exit port (30). When the peripheral flow channel (62) is in an intermediate position fluid exits through both a peripheral exit port and the central exit port.

29 Claims, 18 Drawing Sheets

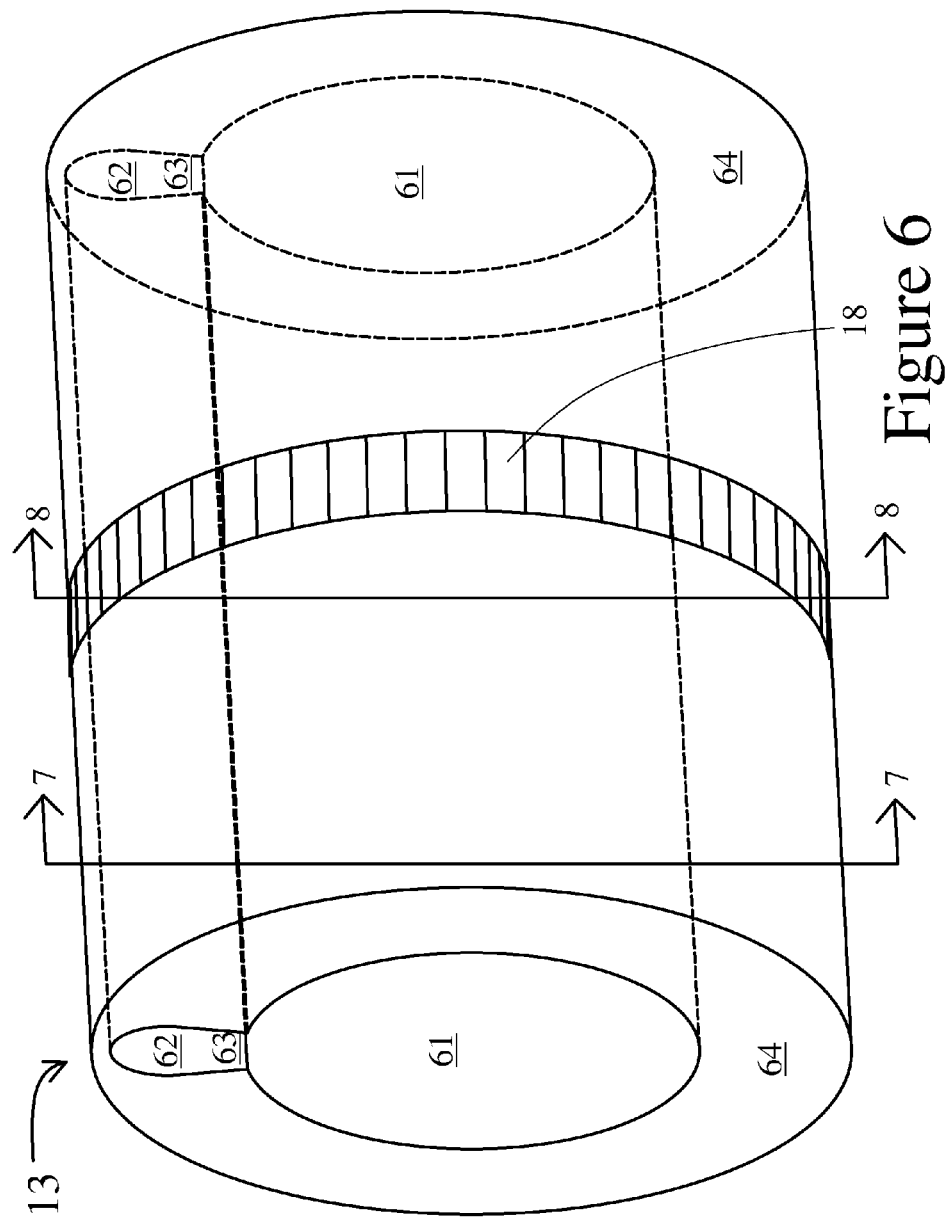

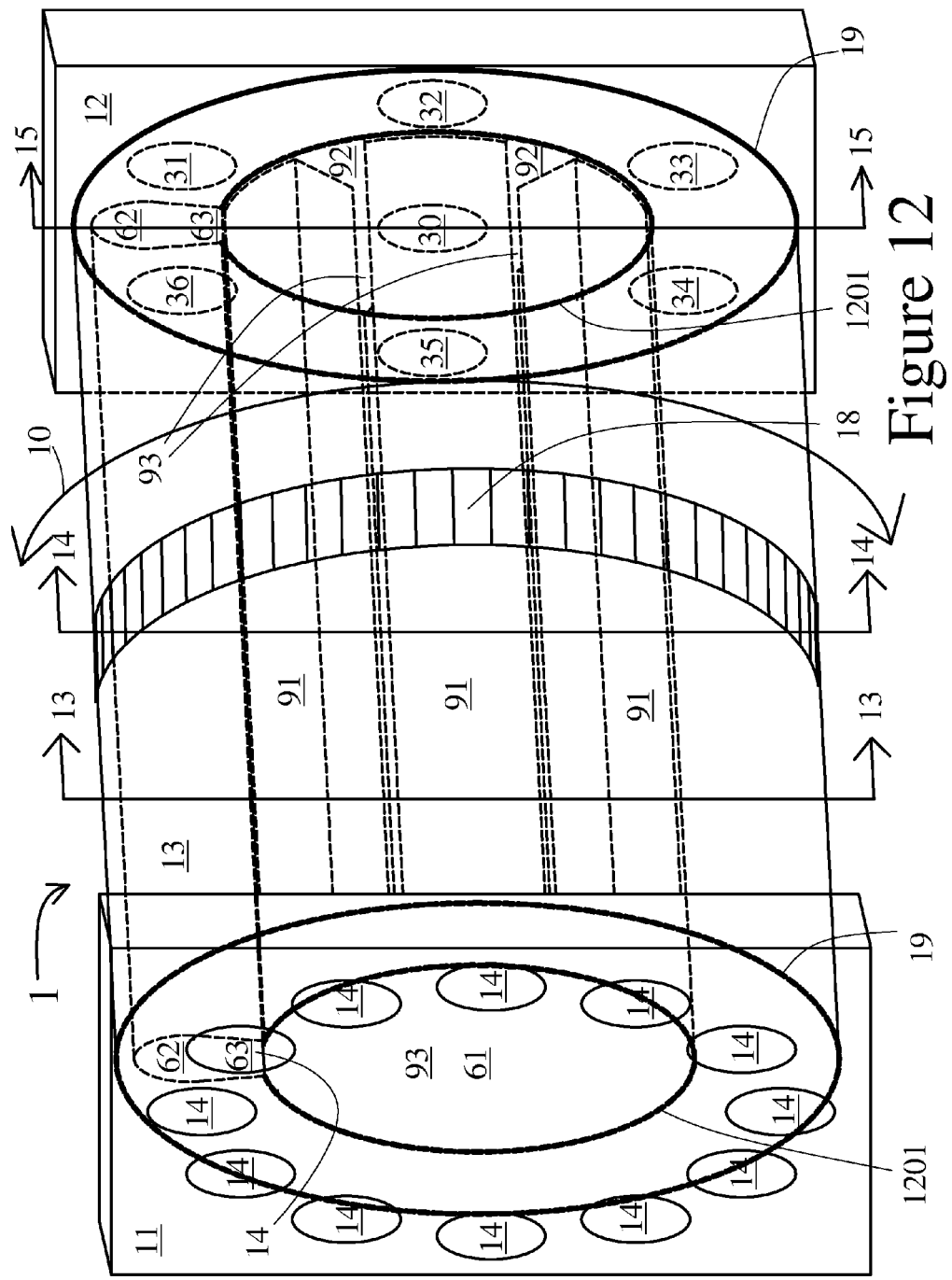

CONTINUOUSLY ADJUSTABLE, MULTI-PORT SELECTION, CONSTANT FLOW CAPABILITY, EXTERNALLY-ACTUATED ROTARY FLOW VALVE APPARATUS, SYSTEM AND METHOD

BACKGROUND OF THE INVENTION

As this patent application is being prepared, wildfires are burning out of control in eastern Arizona. Such situations are not isolated, but are common albeit dismaying facts of life in certain regions of the United States, such as southern California and Arizona, and elsewhere in the world. Fighting and containing such fires is a hugely expensive job, and beyond the economic and human cost of fighting these fires, the economic loss and human suffering is almost immeasurable.

Such fires are often fought with heavy manpower, and with whatever technology can be brought to bear. But water resources (reservoirs), such as lakes, streams, swimming pools, and other bodies of water in the fire-prone areas are often not brought to bear as well as they can be. The problem is that in order to fight a wildfire with water, this water needs to be pumped to the scene at exceptionally high flow rates and pressures, usually by employing gas-powered water pumps typically operating in the vicinity of 100 gallons a minute and at 100 psi. For a continuous flow of water to a single location, there is no problem. But, when it is necessary to switch the deployment of water, that is, to take water which is flowing at high flow and pressure to "location A" and immediately redeploy that flow to "location B," or to smoothly and continuously go from a steady default state where no water is being deployed to a state where water is to be deployed to a particular location, there does not appear in the art to be any fluid flow valves which are up to the task.

In particular, it would be desirable to have available for fighting wildfires, a fluid flow valve apparatus which enables these gas-powered water pumps to operate unattended, while dynamically and automatically switching the deployment of water from one location to another as needed. Such a valve needs to be "invisible" to the gas-powered water pump, so that the gas-powered water pump can operate continuously and unabated, irrespective of the location to which the valve is directing the pump's output. As a "default," the pump should be able to operate continuously without interruption while the valve simply recirculates water from a reservoir back into the reservoir. Then, when the water needs to be routed to a particular location to fight a wildfire, the valve should enable the water to be smoothly and continuously diverted to the desired location, without having to in any way change the unabated, continuous operation of the pump.

Fluid flow control valves have long been used to route the flow of fluid from a source to a selected destination or destinations for emission, while at the same time blocking the flow to other destinations. The prior art contains many such valves, both in US class 137 for Fluid Handling and class 251 for Valves and Valve Actuation.

Among these many valves to be found in the prior art are rotary flow valves, many of which can be found in class 137 subclass 625.46 and class 251 subclass 208. Rotary flow valves of particular interest are included in an information disclosure statement being filed concurrently with this application, and among these, U.S. Pat. No. 3,124,162; U.S. Pat. No. 3,369,565; and U.S. Pat. No. 4,448,214 provide particularly interesting multi-port capabilities.

However, none of the flow valves in the prior art including the three valves referenced above appear to simultaneously provide several particular desirable characteristics and features that are especially helpful to battling wildfires at high flow and pressure rates, namely: a) rotational actuation; b) the ability to achieve a continuous adjustment of flow rates; c) the ability to maintain a recirculating fluid flow other than as an exception, that is, to be able to substantially maintain a continuous recirculation of fluid out of and back into a fluid reservoir except in instances where it is desired to route the fluid elsewhere; d) the capability to provide substantially constant flow rates, that is, for the total flow output from the valve to always be substantially constant, even when the valve is being actuated to divert fluid flow from one place to another, thereby avoiding pressure buildups and variations that would occur if the flow rate was to be substantially altered during fluid rerouting; e) a simple valve configuration with a minimum of movable parts; f) a simple method of valve fabrication and assembly; g) the ability to direct the fluid flow solely by physical actuation against an exterior surface of the valve, rather than by more complex means such as spindles and pivots which connect to elements inside the valve and so are less simple, are more susceptible to breakage and failure, and so require more maintenance attention; and h) invisibility to the pump, particularly to a high-flow, high-pressure pump on the order of at least 75 gallons per minute and at 75 psi, and often 100 gallons a minute and at 100 psi or higher.

It would be very beneficial to provide a rotary flow valve which simultaneously has all of these desirable characteristics and features. Because of its ability to maintain a constant fluid flow other than as an exception, and the ease with which actuation is controlled, such valve is particularly useful as an aid to firefighting when the "exception" is itself the occurrence of a fire, by enabling gas powered water pumps to operate, unmanned.

While the ability to operate continuously in high-flow-high-pressure situations is preferred for fighting wildfires, such a valve can be used in a broad range of other applications as well, including those which use pumps with lower flow rates and pressures.

SUMMARY OF THE INVENTION

Disclosed herein is a rotary flow valve apparatus, comprising: a front plate comprising a plurality of fluid entry ports running therethrough; a rear plate comprising one central fluid exit port running through a substantial center thereof and P peripheral fluid exit ports running through a substantially circumferential periphery thereof, where P is greater than or equal to 1; P flow selector bars integrally connecting the front plate with the rear plate and fixing the front plate relative to the rear plate, each of the P flow selector bars corresponding on a one-to-one basis with one of the P peripheral fluid exit ports and angularly positioned relative to the central fluid exit port at substantially the same angle as its corresponding peripheral fluid exit port; P inter-bar flow channels defined between rotationally-adjacent pairs of the flow selector bars; a selector cylinder comprising a solid cylinder body, a central flow channel running therethrough, a peripheral flow channel running therethrough, and a flow channel neck running therethrough, the flow channel neck providing unimpeded fluidic communication between the peripheral flow channel and the central flow channel; and the selector cylinder seated over and freely and continuously rotatable around the flow selector bars and relative to the front and rear plates.

This rotary flow valve is used for routing the emission of fluid by: introducing fluid into the rotary flow valve via a plurality of fluid entry ports of the rotary flow valve; emitting the fluid through a central fluid exit port of the rotary flow valve by rotating a selector cylinder of the rotary flow valve to a central exit configuration such that a peripheral flow channel of the selector cylinder is substantially aligned with one of P inter-bar flow channels defined between rotationally-adjacent pairs of P flow selector bars of the rotary flow valve and consequently is in fluidic communication with a central fluid exit port of the rotary flow valve, where P is greater than or equal to 1; emitting the fluid through a given one of P peripheral fluid exit ports of the rotary flow valve by rotating the selector cylinder to a peripheral exit configuration such that the peripheral flow channel is substantially aligned with the given one of the peripheral fluid exit ports and is blocked from fluidic communication with the central fluid exit port by the corresponding flow selector bar; and emitting the fluid partially through the central fluid exit port and in remaining part through the given one of the peripheral fluid exit ports by rotating the selector cylinder to a mixed, two-port exit configuration such that the peripheral flow channel is partially aligned with the one of the inter-bar flow channels and in remaining part aligned with a given one of the peripheral fluid exit ports.

BRIEF DESCRIPTION OF THE DRAWINGS

The features of the invention believed to be novel are set forth in the appended claims. The invention, however, together with further objects and advantages thereof, may best be understood by reference to the following description taken in conjunction with the accompanying drawing(s) summarized below.

FIG. 6 is a side-front perspective view illustrating details of a rotatable selector cylinder, in a preferred embodiment of the invention.

FIG. 12 is a side-front perspective view illustrating the complete rotary flow valve of FIG. 1, with broken-line views of key hidden elements shown in FIG. 9 enclosed within the rotatable selector cylinder of FIG. 6.

DETAILED DESCRIPTION

Figure 1:
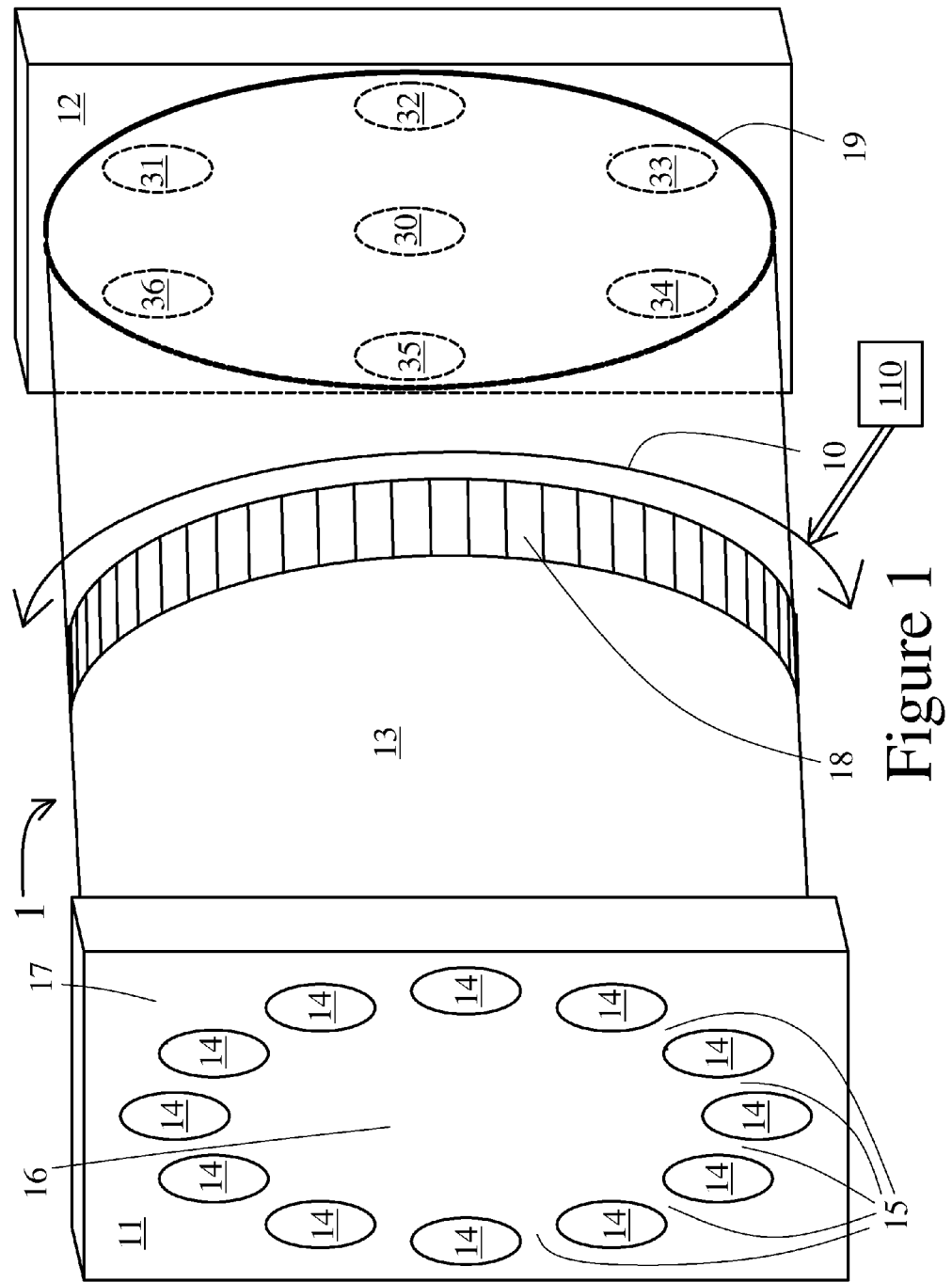
FIG. 1 is a side-front perspective view illustrating a preferred embodiment of the rotary flow valve invention for directing and routing fluid flow therethrough.

FIG. 1 illustrates a rotary flow valve 1 in a preferred embodiment of the invention, as it appears to an external observer. Throughout the drawings, broken lines will be used illustrate matter that is hidden from view.

Fluid, such as but not limited to water, enters valve 1 through each and every one of a plurality of fluid entry ports 14 running through a front plate 11, and eventually exits valve 1 through either one or two of a plurality of fluid exit ports comprising central fluid exit port 30 and peripheral fluid exit ports 31, 32, 33, 34, 35, and 36 running through a rear plate 12. As will be detailed in the discussion to follow, particularly in FIG. 9, front plate 11 and rear plate 12 are substantially fixed and immobile relative to one another, transversely, longitudinally, and rotationally.

As can be seen, these peripheral fluid exit ports 31, 32, 33, 34, 35, and 36 define a substantial circle circumferentially about central fluid exit port 30. While seven (7) fluid exit ports 30 through 36 are illustrated in FIG. 1 and throughout the drawings, it is to be understood that this is for example not limitation, and that more or less ports can be provided within the scope of this disclosure and its associated claims. In all cases, however, the invention is practiced with exactly one (1) central fluid exit port 30, but may have as few as one (1) or two (2) and as many as twelve (12) peripheral fluid exit ports on a single valve 1. In general, the size of the ports are driven by what is needed to accommodate the flow requirements, while the number of desired ports determines the overall size of the valve. Additionally, as is later illustrated in FIG. 23, if one finds it desirable to have a larger number of fluid exit ports, one can increase the number of exit ports by using two or more valves 1 in series, as an alternative to increasing the number of exit ports on a single valve 1.

When fluid is flowing through valve 1 from front (entry) to rear (exit), the determination (selection) of the fluid exit ports through which the fluid exits valve 1 is made by rotating a flow selector cylinder 13 relative to both front plate 11 and rear plate 12, into a selected orientation along the circumferential direction indicated by the bi-directional rotational arrow 10. This rotation takes place along a rear outer rotation juncture 19 between selector cylinder 13 and rear plate 12, which juncture is illustrated by a thicker drawing oval. This rotation simultaneously takes place along a front outer rotation juncture 19 between front plate 11 and selector cylinder 13, which juncture is hidden from view in FIG. 1, but is shown in its hidden view by broken lines in FIG. 12. With the front plate 11 and rear plate 12 being fixed and immobile relative to one another, the selection of fluid exit ports 30 through 36 is made by rotating 10 flow selector cylinder 13 to particular rotational orientations relative to front plate 11 and rear plate 12, as will be detailed herein. Rotation 10 of flow selector cylinder 13 relative to front and rear front plates 11 and 12 is achieved using a rotational actuator 18, which may be, for example not limitation, a series of standard gear teeth, shown in cross section in FIGS. 8 and 14. It is of particular interest— and makes this invention particularly simple to use and provides great flexibility of use—that this rotation of flow selector cylinder 13 in order to select the fluid exit ports 30, 31, 32, 33, 34, 35, 36 through which fluid will exit, is achieved wholly and entirely by external actuation. That is, it is very beneficial and simplifying that flow selector cylinder 13 is rotated by a point or points of physical contact along 18 (and more generally against the exterior surface of 13) which are physically accessed wholly and entirely externally to rotary flow valve 1.

As will be elaborated further in the discussion to follow, there are three basic configurations in which fluid which has entered flow valve 1 through fluid entry ports 14, exits through central fluid exit port 30 and peripheral fluid exit ports 31, 32, 33, 34, 35, and 36. First, in a "central exit" configuration, all of the fluid exits only through central fluid exit port 30. The configuration in which this is achieved, is later illustrated by FIG. 16. These is a "default" configuration which is also illustrated generally in most of the other drawings. Second, in a "peripheral exit" configuration, all of the fluid exits only through a single one of the peripheral fluid exit ports 31, 32, 33, 34, 35, and 36. That is, depending on the selected rotational orientation 10 of selector cylinder 13, the fluid exits through exactly one and only one of peripheral fluid exit ports 31, or 32, or 33, or 34, or 35, or 36. The configuration in which this is achieved, is later illustrated by FIG. 17. Third, there is a "mixed, two-port exit" configuration in which some of the fluid exits through central fluid exit port 30, and the balance of the fluid exits through exactly one and only one of peripheral fluid exit ports 31, or 32, or 33, or 34, or 35, or 36, in continuously-adjustable relative proportion. The configuration in which this is achieved, is later illustrated by FIG. 18.

It is one benefit of this invention that in the "mixed, two-port exit" configuration, the distribution of fluid is continuously-adjustable as between central fluid exit port 30 and the selected one of peripheral fluid exit ports 31, 32, 33, 34, 35, and 36. That is, for example, the selected configuration may cause one percent (1%) of all fluid to exit through central fluid exit port 30 and ninety-nine percent (99%) to exit through peripheral fluid exit port 31 (or 32, or 33 or 34 or 35 or 36, if selected). Or, for another example, the selected configuration may cause ninety-nine percent (99%) of all fluid to exit through central fluid exit port 30 and one percent (1%) to exit through peripheral fluid exit port 31 (or 32, or 33 or 34 or 35 or 36, if selected). And, more generally, one may adjust this proportionality continuously, without limitation, so as to achieve any other desired proportionate balance as between fluid flow from central fluid exit port 30 and a selected one of peripheral fluid exit ports 31, 32, 33, 34, 35, and 36, for another example, 50% through central fluid exit port 30 and 50% through a selected one of peripheral fluid exit ports 31, 32, 33, 34, 35, and 36.

The decisions about exactly when to rotate 10 flow selector cylinder 13, and to which rotational orientations, can be made by a human being. However, it is preferred that this be done electronically, via a control module 110, such as but not limited to an encoded gear motor with a programmable logic controller (PLC), schematically illustrated in FIG. 1 as controlling the rotation 10. Such encoded gear motors with a programmable logic controllers (PLC) are well-known to those of ordinary skill in the art. This control module 110 is electronically programmed for controlling actuation of the rotation 10 of selector cylinder 13, thereby electronically controlling the exiting of fluid among the central fluid exit port 30 and the peripheral fluid exit ports 31, 32, 33, 34, 35, and 36 according to this electronic programming.

Figure 20:
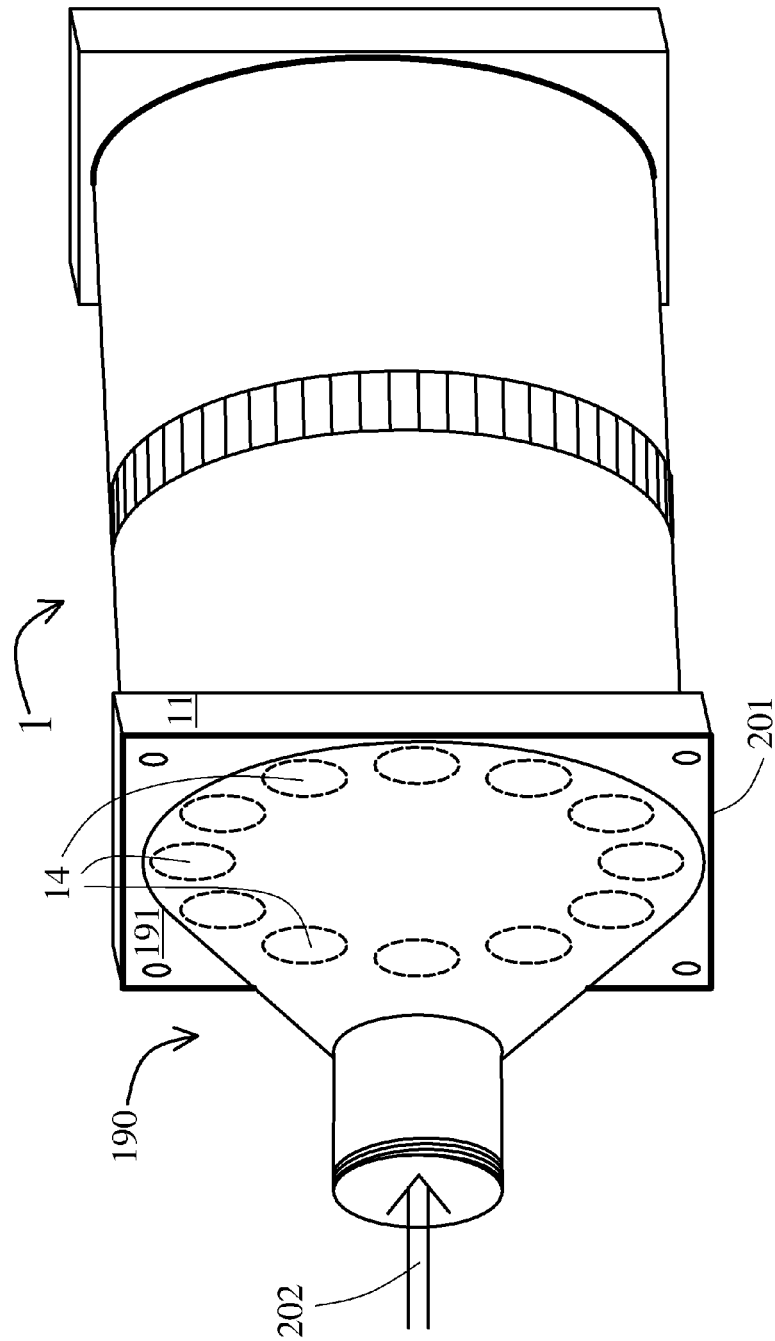
FIG. 20 is side-front perspective view illustrating the rotary flow valve of FIG. 1, with the fluid supply assembly of FIG. 19 attached to the front plate of the rotary flow valve.
Figure 22:
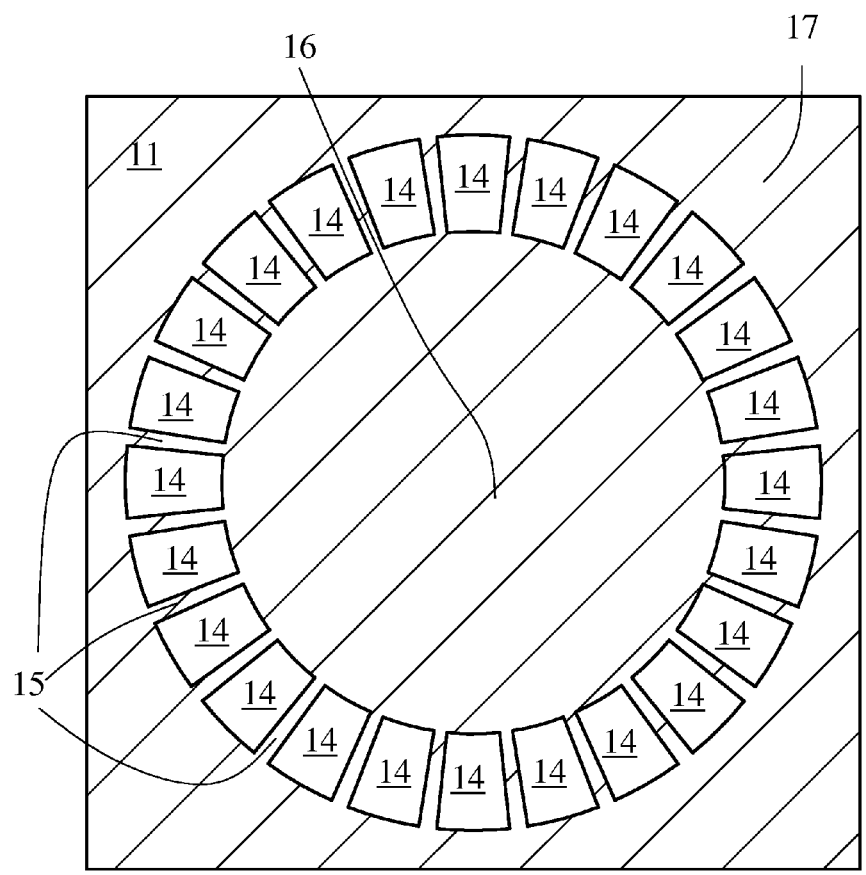
FIG. 22 a side-front perspective view illustrating a front plate comprising a plurality of fluid entry ports, in an alternative, non-limiting variation of what is shown in FIG. 4.

The illustrated arrangement of fluid entry ports 14 running through front plate 11 in FIG. 1 is merely illustrative, and not limiting. While the illustration of FIG. 1 shows twelve such fluid entry ports 14—six of which are aligned with peripheral fluid exit ports 31, 32, 33, 34, 35, and 36—a virtually unlimited number of arrangements of fluid entry ports 14 may be employed within the scope of this disclosure and its associated claims. FIG. 22, for example, not limitation, shows a cross-sectional view of an alternative embodiment for fluid entry ports 14 running through front plate 11. Irrespective of the chosen variation for the arrangement of fluid entry ports 14, front plate 11 comprises three regions of interest which are explained by looking at both FIGS. 1 and 22 (or FIGS. 4 and 22 for the most direct comparison): First, an outer front plate region 17 which is situated outside the circumferential circle formed by the plurality of fluid entry ports 14. Second, an inner front plate region 16 which is situated inside the circumferential circle formed by the plurality of fluid entry ports 14. Third, an intermediate front plate region 15 which is situated in between the fluid entry ports 14 and forms part of the circumferential circle defined by the plurality of fluid entry ports 14. The intermediate front plate region 15 serves to hold together the outer front plate region 17 and the inner front plate region 16, so that front plate 11 may be fabricated to comprise a single, unitary plate with structural integrity. When fluid enters flow valve 1, it is introduced so as to enter through all of fluid entry ports 14, and of equal importance, at the same time it is blocked from entry by inner front plate region 16. Thus, fluid enters through the circumferential circle region formed by the plurality of fluid entry ports 14, and is blocked from entering through the inner front plate region 16 situated inside this the circumferential circle region. FIG. 20 serves to illustrate further, how fluid is introduced to enter flow valve 1 in this manner.

There are two reasons why the arrangement of fluid entry ports 14 illustrated in FIG. 1 has been chosen throughout all the drawings with the exception of FIG. 22. First, for purposes of this disclosure, it is simplest to explain the invention using the particular arrangement illustrated in FIG. 1. Secondly, in operation, when the fluid entry ports 14 are the same size as, and (for every other fluid entry port 14) are inline with the peripheral fluid exit ports, one achieves maximum flow through the rotary flow valve 1 with the least back pressure.

While the rotational actuator 18 illustrated in the drawings shows teeth which are triangular, this is understood to be illustrative, not limiting. In practice, it may be preferred to employ square teeth, such as those used for automobile timing belts, or any other type of configuration that may be known to someone of ordinary skill in the art for effectuating rotation of a round cylinder or similar round or circular object. While it is envisioned that in some embodiments rotational actuator 18 will be driven by a driving belt (not shown) akin to an automobile timing belt, it is also envisioned that in other embodiments rotational actuator 18 may also be driven by suitably-mating gears (also not shown). And in general, what matters is not the specific means of rotating flow selector cylinder 13 relative to front and rear front plates 11 and 12, but the fact that there be some means for rotating flow selector cylinder 13 so as to control and fix this relative rotational orientation.

So, to summarize the discussion of FIG. 1: fluid flows into rotary flow valve 1 through each and every one of fluid entry ports 14, and exits through either a) central fluid exit port 30 (central exit), b) exactly one of peripheral fluid exit ports 31, 32, 33, 34, 35, or 36 (peripheral exit), or c) some combination of a) and b) in continuously adjustable proportion (mixed, two-port exit). The selection of which ports the fluid exits from is determined by the rotational orientation 10 of selector cylinder 13 relative to mutually-fixed front and rear front plates 11 and 12. And finally, this rotation 10 of selector cylinder 13 to select the fluid exit port or ports 30 through 36 is actuated by a physical point or points of contact along selector cylinder 13—for example, not limitation, rotational actuator 18—which are wholly and entirely external to rotary flow valve 1, thereby making the selection of an fluid exit port or ports particularly simple and flexible from a mechanical viewpoint.

The balance of this disclosure, is to explain how the internal configuration and mechanics of rotary flow valve 1 enable the foregoing operational results and benefits to be achieved.

Figure 2:
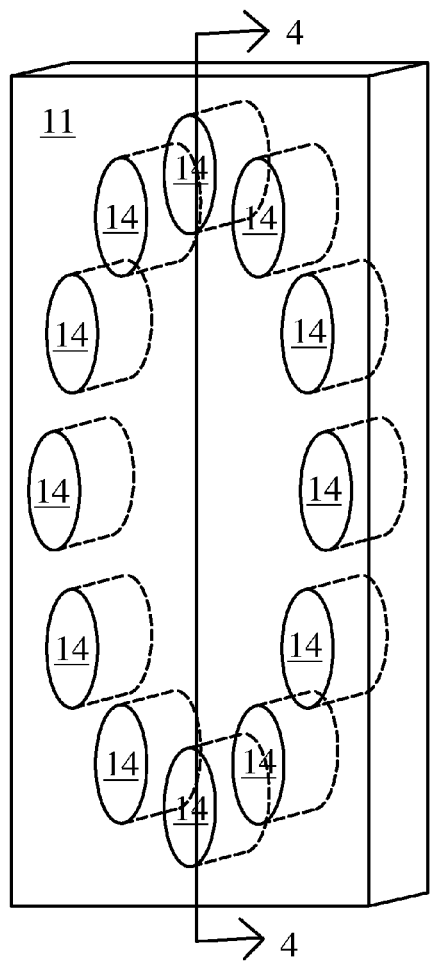
FIG. 2 is a side-front perspective view illustrating a front plate comprising a plurality of fluid entry ports, in one, preferred variation.

FIG. 2 illustrates the front plate 11 comprising a plurality of fluid entry ports 14, in preferred embodiment of the invention which, as noted earlier, is exemplary, not limiting. Additional hidden matter is detailed using the broken lines in FIG. 2, showing the open fluid passage holes through front plate 11 provided by each of fluid entry ports 14.

Figure 3:
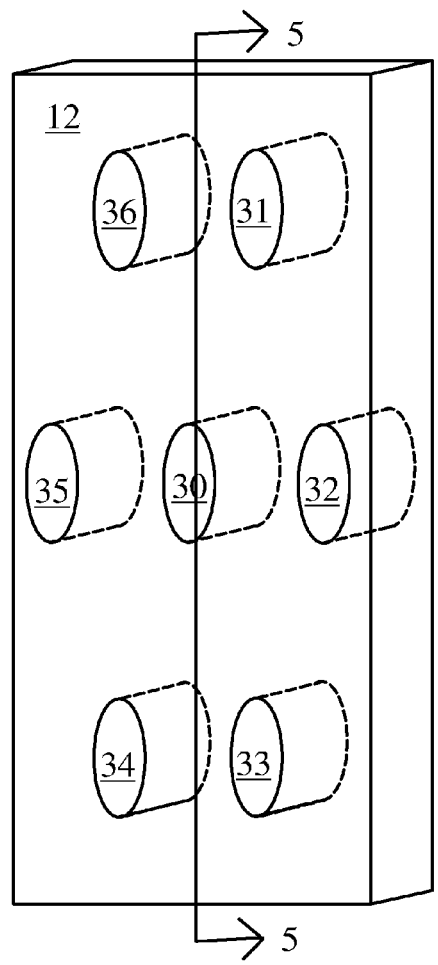
FIG. 3 is a side-front perspective view illustrating a rear plate comprising a plurality of fluid exit ports, including a central fluid exit port and a plurality of peripheral fluid exit ports, in a preferred, illustrative, non-limiting embodiment of the invention.

FIG. 3 illustrates rear plate 12 comprising central fluid exit port 30 and peripheral fluid exit ports 31, 32, 33, 34, 35, and 36, in a preferred embodiment with six (6) such fluid exit ports. As noted earlier, this number of peripheral fluid exit ports can be varied. Additional hidden matter is detailed using the broken lines in FIG. 3, showing the open fluid passage holes through rear plate 12 provided by central fluid exit port 30 and each of the peripheral fluid exit ports 31, 32, 33, 34, 35, and 36.

Figure 4:
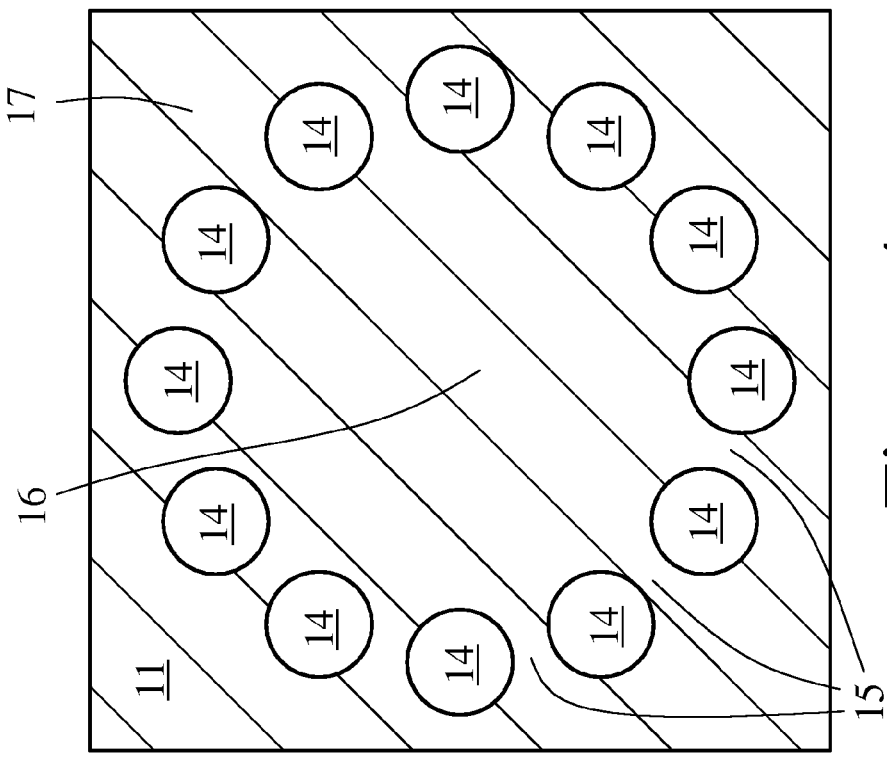
FIG. 4 is a cross-sectional view of the front plate, taken along the section 4-4 of FIG. 2.

The cross sectional view of FIG. 4 further illustrates front plate 11 and fluid entry ports 14, taken along the section 4-4 of FIG. 2, as well as the earlier-discussed intermediate front plate region 15, inner front plate region 16, and outer front plate region 17 of front plate 11. Diagonally-hatched lines are used to indicate solid sections of the rotary flow valve apparatus, while fluid entry ports 14 are open holes freely permitting fluid passage and so do not contain this hatching. As discussed earlier, intermediate front plate region 15 enables front plate 11 to be fabricated as a single, unitary plate with structural integrity, bridging together inner front plate region 16 and outer front plate region 17. As noted earlier, fluid enters flow valve 1 through fluid entry ports 14, and at the same time is blocked from entry by inner front plate region 16.

Figure 5:
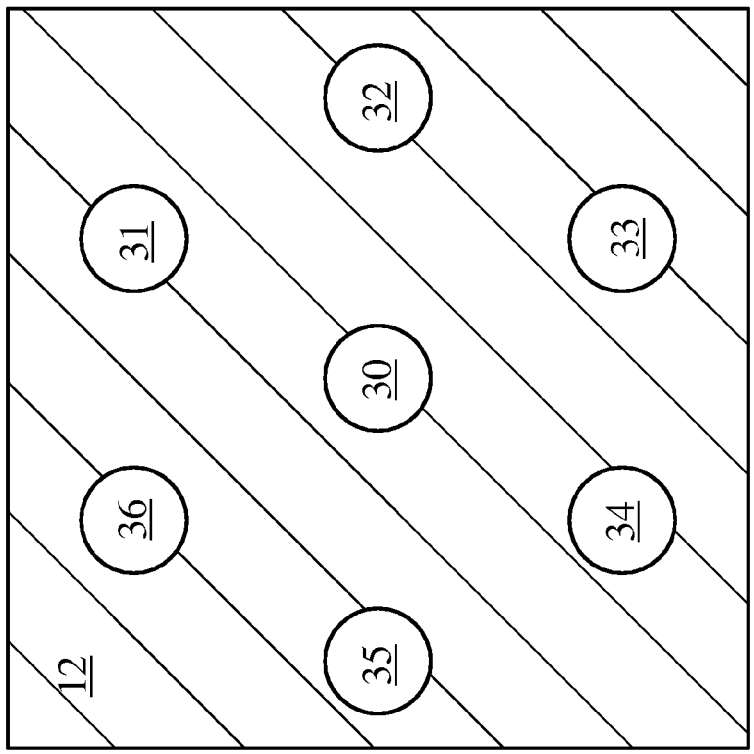
FIG. 5 is a cross-sectional view of the rear plate, taken along the section 5-5 of FIG. 3.

The cross sectional view of FIG. 5 further illustrates rear plate 12 together with central fluid exit port 30 running substantially through a center thereof and each of the peripheral fluid exit ports 31, 32, 33, 34, 35, and 36 running substantially through a circumferential periphery thereof, taken along the section 5-5 of FIG. 3. Again, diagonally-hatched lines are used to indicate solid sections of the rotary flow valve, and that exit ports 30, 31, 32, 33, 34, 35, and 36 which omit hatching are all open holes freely permitting fluid passage.

Figure 8:
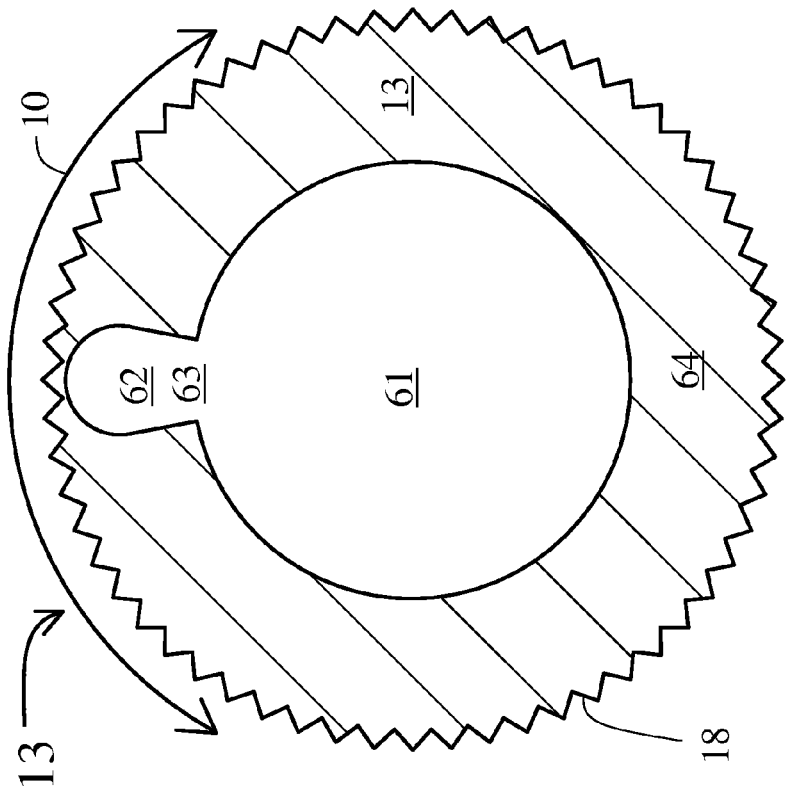
FIG. 8 is a cross-sectional view taken along the section 8-8 of FIG. 6.
Figure 7:
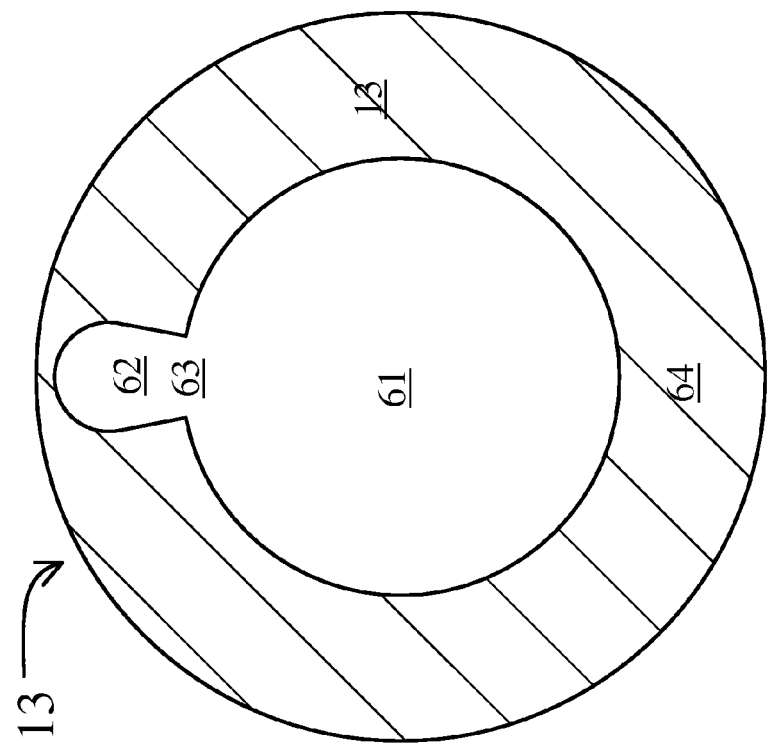
FIG. 7 is a cross-sectional view taken along the section 7-7 of FIG. 6.

FIG. 6 now illustrates the internal details of selector cylinder 13, in a preferred embodiment of the invention. Selector cylinder 13 comprises a solid cylinder body 64, a central flow channel 61, a peripheral flow channel 62 and a flow channel neck 63 running therethrough, and open so as to permit free fluid flow therethrough, from front (left side of FIG. 6) to back (right side of FIG. 6). Also shown is the externally-accessible rotational actuator 18 discussed earlier in connection with FIG. 1. FIG. 7 shows a cross-sectional view of FIG. 6 taken along the section 7-7, while FIG. 8 shows a cross-sectional view of FIG. 6 taken along the section 8-8, with the absence of the diagonally-hatched lines indicating that central flow channel 61, peripheral flow channel 62 and flow channel neck 63 are open channels freely permitting fluid passage all the way therethrough. This serves to further highlight the front-to-back open nature of central flow channel 61, peripheral flow channel 62 and flow channel neck 63, with flow channel neck 63 flow channel neck 63 providing an unimpeded fluidic connection between peripheral flow channel 62 and central flow channel 61.

Because selector cylinder 13 is rotatable 10 via rotational actuator 18 relative to front plate 11 and rear plate 12 as discussed earlier in connection with FIG. 1, this means that peripheral flow channel 62 and flow channel neck 63 will be rotationally situated and may be rotationally resituated relative to peripheral fluid exit ports 31, 32, 33, 34, 35, and 36, depending upon the rotational orientation of selector cylinder 13. It is this rotational 10 movement of peripheral flow channel 62 and flow channel neck 63 relative to peripheral fluid exit ports 31, 32, 33, 34, 35, and 36 which determines through which of the fluid exit ports 30, 31, 32, 33, 34, 35, and 36 the fluid will exit rotary flow valve 1.

Figure 9:
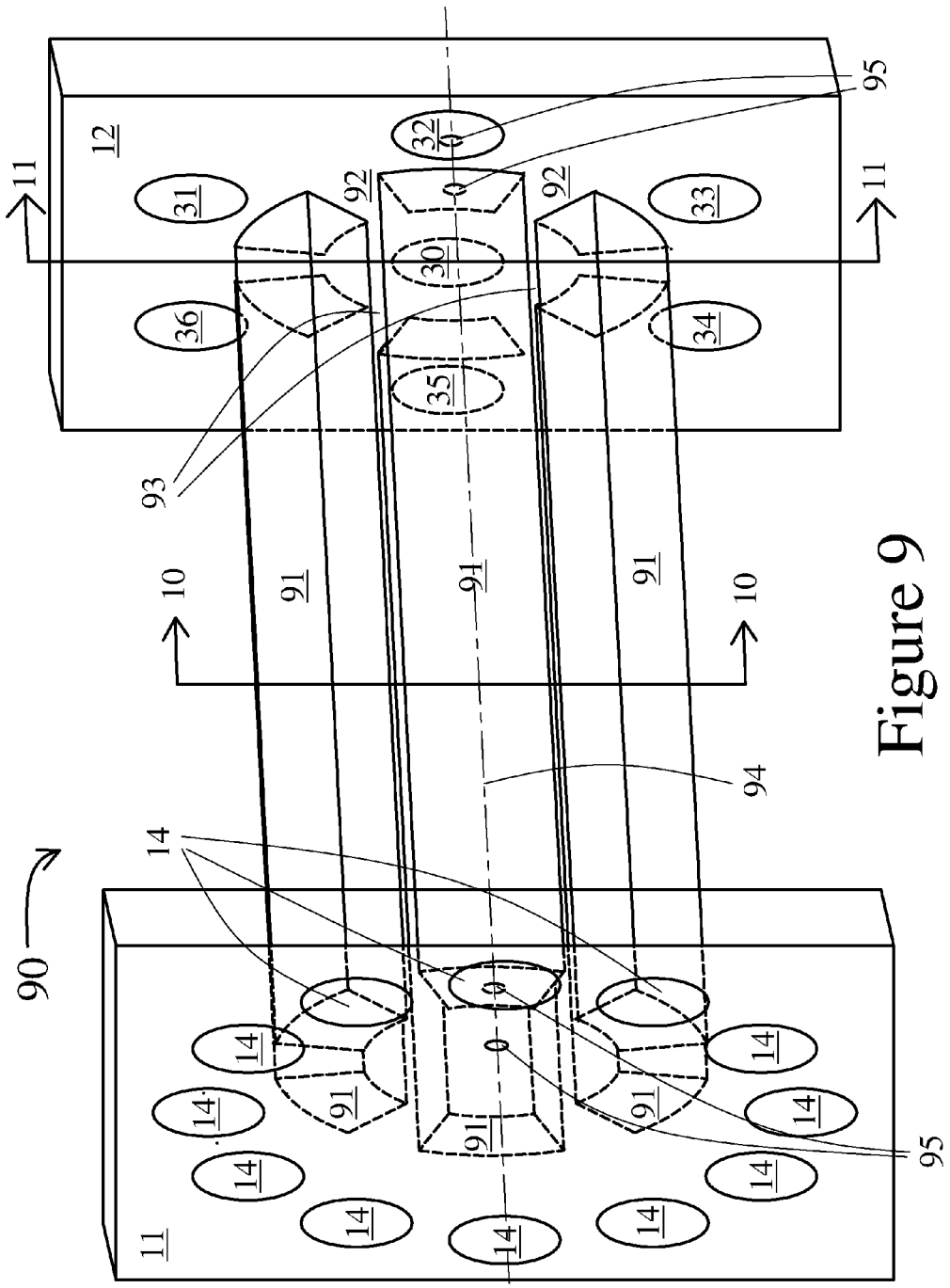
FIG. 9 is a side-front perspective view illustrating details of flow selector bars which integrally connect the front plate of FIG. 2 with the rear plate or FIG. 3 and work in combination with the selector cylinder of FIG. 6 to determine through which of the fluid exit ports the fluid will exit.

FIG. 9 now illustrates a plurality of flow selector bars 91 which integrally connect front plate 11 with rear plate 12 and work in combination with the selector cylinder 13 just discussed to determine through which of the fluid exit ports 30, 31, 32, 33, 34, 35, and 36 the fluid will exit. Earlier, in connection with FIG. 1, it was stated that front plate 11 and rear plate 12 are fixed and immobile relative to one another, transversely, longitudinally, and rotationally. We now see how this fixed connection is achieved via flow selector bars 91 which do integrally connect and substantially immobilize and fix front plate 11 relative to rear plate 12. This fixed, relatively immobile, unitary combination of front plate 11, rear plate 12 and flow selector bars 91 will henceforth be referred to as the central valve assembly 90. The flow selector bars 91 of central valve assembly 90, as will be explored shortly in connection with FIG. 12, are enclosed by the selector cylinder 13 just discussed in FIGS. 6-8, which freely rotates 10 in relation to central valve assembly 90.

The particular exemplary, non-limiting embodiment of FIG. 9 illustrates six (6) flow selector bars 91, which correspond on a one-to-one basis with the six (6) peripheral fluid exit ports 31, 32, 33, 34, 35, and 36 running through rear plate 12 which are also used to illustrate this particular exemplary, non-limiting embodiment. As noted earlier, the invention in all embodiments and variations is practiced with exactly one (1) central fluid exit port 30, but may have as few as one (1) and as many as twelve (12) peripheral fluid exit ports. So in general, there will be a one-to-one correspondence between the number of peripheral fluid exit ports (which number we designate as P) and the number of flow selector bars. In an embodiment with, for example, not limitation, eight (P=8) peripheral fluid exit ports, there will also be exactly eight (P=8) flow selector bars 91 connecting front plate 11 with rear plate 12.

For a P=1 embodiment of the invention, in which there is but a single flow selector bar 91, the structural stability wherein front plate 11 and rear plate 12 are fixed and immobile relative to one another is achieved in one of two ways. As a first option, the single flow selector bar 91 is configured to cover a greater angular range than is shown in FIG. 9, effectively forming a "C" of at least 90 degrees and preferably 120, 150, 180, 210, 240 or even 270 degrees, or anything in between 90 and 270 degrees. This wide-angled "C" provide the structural integrity for the required fixed and immobile relationship between front plate 11 and rear plate 12. As a second, alternative option, if the single flow selector bar is less than 90 degrees, a stability bar or rod (not shown) connecting front plate 11 with rear plate 12 can be placed approximately 180 degrees away from the single flow selector bar 91, such that the single flow selector bar 91 in combination with the stability bar or rod provide the required fixed and immobile relationship between front plate 11 and rear plate 12.

In all of the discussion to follow, in which we will refer to various angles, zero (0) degrees will be defined in the conventional manner by a ray starting at the center of the drawing under consideration, and directed horizontally to the right.

Figure 11:
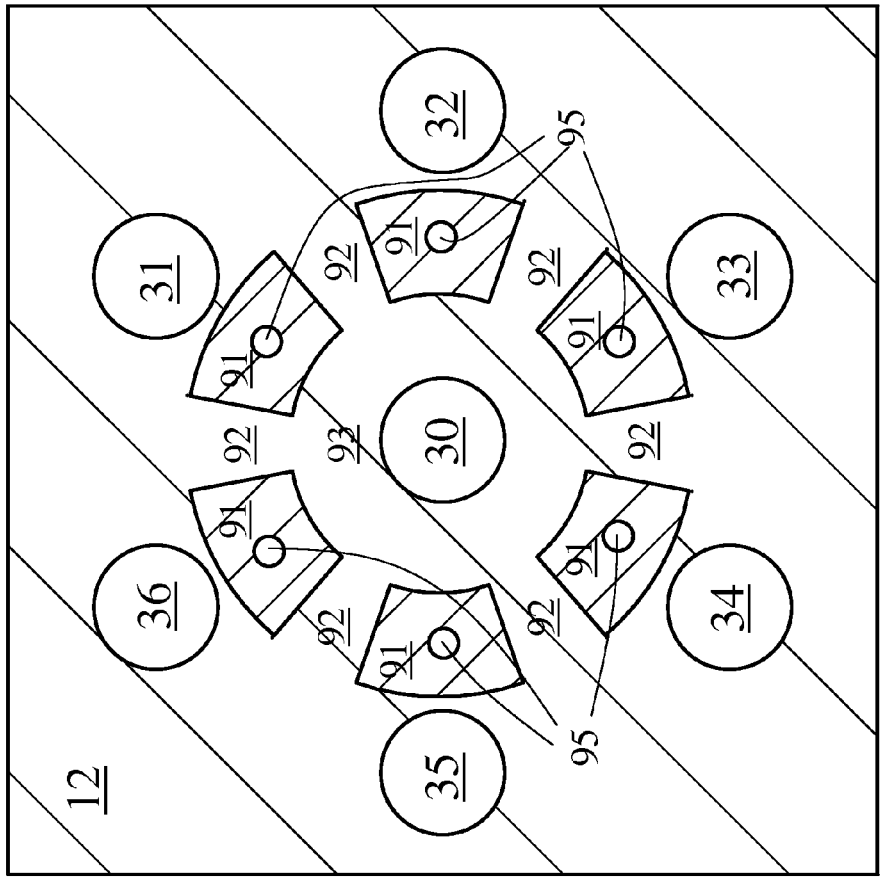
FIG. 11 is a cross-sectional view taken along the section 11-11 of FIG. 9.
Figure 10:
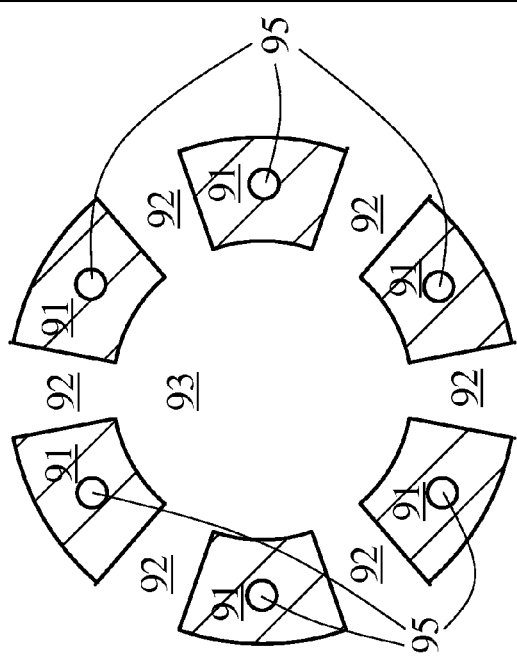
FIG. 10 is a cross-sectional view taken along the section 10-10 of FIG. 9.

FIG. 10, which is a cross-sectional view taken along the section 10-10 of FIG. 9, and FIG. 11, which is a cross-sectional view taken along the section 11-11 of FIG. 9, serve to further illustrate this configuration of flow selector bars 91. Referring particularly to FIG. 11, which is the cross section taken at the juncture between flow selector bars 91 and rear plate 12, we see not only that there is a paired one-to-one correspondence between the number of peripheral fluid exit ports and the number of flow selector bars 91, but also, that each flow selector bar is angularly-positioned relative to central fluid exit port 30 at substantially the same angle as its corresponding peripheral fluid exit port. For example, in FIG. 11, peripheral fluid exit port 32 and the rightmost flow selector bar 91 pair are both centered at approximately zero degrees in relation to central fluid exit port 30. Moving counterclockwise from there, peripheral fluid exit port 31 and the next flow selector bar 91 are both paired and centered at approximately sixty degrees in relation to central fluid exit port 30. And so on. And, it will be seen that angle between any two adjacent flow selector bar and peripheral fluid exit port pairs is substantially equal. So for the (6) peripheral fluid exit ports 31, 32, 33, 34, 35, and 36 used in the embodiment illustrated by this disclosure, the angle between fluid exit port/flow selector bar pairings is substantially 360/6=60 degrees. For a twelve (12) peripheral fluid exit port embodiment, this angle would be substantially 360/12=30 degrees. And so on.

As is most clearly seen in cross-sectional FIGS. 10 and 11, flow selector bars 91 are circumferentially situated about, and serve to define, an interior flow channel 93. Additionally, and importantly, flow selector bars 91 are also spaced apart from one another, thus defining a plurality of inter-bar flow channels 92 between rotationally-adjacent pairs of flow selector bars 91. It should be apparent that for all embodiments of the invention—not just the six (6) peripheral fluid exit port embodiment illustrated here—the number of flow selector bars 91 is equal to the number of inter-bar flow channels 92 which is also equal to the number of peripheral fluid exit ports which in the illustrated embodiment are numbered 31, 32, 33, 34, 35, and 36.

Now, returning to FIG. 9, we have already made clear that central valve assembly 90 comprising front plate 11, rear plate 12 and flow selector bars 91 is a unitary, fixed assembly. However, there are a range of options that will be apparent to someone of ordinary skill for creating such a unitary, fixed assembly, all of which are regarded to be within the scope of this disclosure and its associated claims.

In one embodiment of the invention, front plate 11, rear plate 12 and flow selector bars 91 are all simply fabricated as a single, seamless assembly unit, the individual components of which cannot be assembled/connected or disassembled/disconnected.

In another embodiment of the invention, each one of the flow selector bars 91 comprises an assembly hole 95 running through its entire length along tie line 94, and each of front plate 11 and rear plate 12 has a similar assembly hole 95 also aligned along tie line 94. To avoid drawing clutter, assembly hole 95 has only been shown for one of the six flow selector bars 91 in FIG. 9, but in FIGS. 10 and 11 the assembly holes 95 have been shown for all six flow selector bars 91. Then, given assembly holes 95, the entire central valve assembly 90 is assembled, for example, not limitation, by running a tie rod (not shown) along tie line 94 through all of the assembly holes 95 through front plate 11, flow selector bars 91, and rear plate 12, and then tightly securing the tie rod on each end via, e.g., screw threads, nuts and bolts, or similar well-known means so as to tightly squeeze front plate 11, flow selector bars 91, and rear plate 12 together into the unitary central valve assembly 90. Because fluid will be flowing through central valve assembly 90, it is important not only that that this assembly be tightly fixed, but also that it be well-sealed at the junctures between the flow selector bars 91 and each of the front 11 and rear 12 plates. Thus, it may be desirable at these junctures to provide some form of rubberized or similar seals or gaskets such as are well-known in the art, for the purpose of providing the appropriate and necessary seal.

Irrespective of the method by which one creates central valve assembly 90 comprising front plate 11, rear plate 12 and flow selector bars 91 as a unitary, fixed assembly, what is important is that this assembly be created in some manner, and that there are clearly variety of methods well-known in the art for doing so. The reason why it is important to discuss this at all, is because as we will see when we momentarily turn to FIG. 12, the flow selector bars 91 of central valve assembly 90 must sit inside of selector cylinder 13, while simultaneously, selector cylinder 13 must in turn sit between and rotate 10 relative to front plate 11 and rear plate 12. So some care and thought must be given as to the method by which the entire rotary flow valve 1 comprising both central valve assembly 90 and selector cylinder 13 rotating 10 relative thereto, is to be created as an overall article of manufacture. If central valve assembly 90 comprising front plate 11, rear plate 12 and flow selector bars 91 are to be fabricated as a single, seamless assembly unit, than this fabrication must take place through (91) and also around (11 and 12) selector cylinder 13, which may be preferred in terms of the unitary nature of central valve assembly 90, but may be more challenging from a manufacturing perspective. On the other hand, from a manufacturing perspective, the embodiment using tie lines 94 running through assembly holes 95 which are then tightly secured with suitable sealing is much simpler. That is because in this manufacturing embodiment, one simply can, for example, not limitation, with suitable sealing, a) attach the rear ends of flow selector bars 91 to rear plate 12, b) slide selector cylinder 13 over flow selector bars 91, c) attach front plate 11 to the front ends of flow selector bars 91, and d) use the tie rods along ties lines 94 to tighten the entire rotary flow valve 1.

Understanding this, it will become apparent one may also utilize a third embodiment for manufacturing central valve assembly 90 as a unitary, fixed assembly, which is a hybrid of the two embodiments previously mentioned. In this hybrid embodiment, rear plate 12 and flow selector bars 91 are fabricated as a single, seamless assembly unit, the individual components of which cannot disassembled or disconnected, and only front plate 11 contains assembly holes 95. Here, the front ends of flow selector bars 91 further comprise integral tie rods with screw threads or the like which can simply pass through assembly holes 95 of front plate 11 and are then tightly secured. In this embodiment, the method for assembling the entire rotary flow valve 1 is, with suitable sealing, to a) slide selector cylinder 13 over flow selector bars 91 which are already integrally fabricated with rear plate 12, b) slide the tie rods through the assembly holes 95 in front plate 11, and c) tighten the entire rotary flow valve 1.

It should also be clear that a fourth embodiment can be achieved in like fashion, by simply switching front and rear in the preceding paragraph, i.e., by fabricating front plate 11 and selector bars 91 as a single, seamless assembly unit, having only rear plate 12 contain assembly holes 95, having the tie rods on the rear ends of flow selector bars 91, and performing a similar assembly of rotary flow valve 1 in which one situates selector cylinder 13 over the flow selector bars 91, slides the tie rods through the assembly holes 95 in rear plate 12, and then tightens up the entire rotary flow valve 1 with suitable sealing as needed.

FIG. 12 now illustrates the complete rotary flow valve 1 of FIG. 1, with broken-line views of key hidden elements shown in FIG. 9 enclosed within the rotatable selector cylinder of FIG. 6. Here, we see explicitly, as just discussed, the manner in which flow selector bars 91 sit inside of selector cylinder 13, while simultaneously, selector cylinder 13 in turn sits between and rotates 10 relative to front plate 11 and rear plate 12. FIG. 12 can be regarded as FIG. 1 embellished to show what is hidden under or behind selector cylinder 13, or, equivalently, can be regarded as FIG. 9, with the selector cylinder 13 of FIG. 6 now seated over and freely rotatable 10 around the flow selector bars 91. Only a key portion of what is hidden within selector cylinder 13 is shown in FIG. 12, merely to avoid too much drawing clutter. Thus, it is helpful to simultaneously refer to FIGS. 13, 14 and 15, which illustrate cross sections of FIG. 12 taken along the respective views 13-13, 14-14 and 15-15.

First, let's review in more depth, how selector cylinder 13 rotates 10 relative to front plate 11 and rear plate 12 about flow selector bars 91. As noted in the earlier discussion of FIG. 1, this rotation occurs along the rear outer rotation juncture 19 between selector cylinder 13 and rear plate 12, which juncture is illustrated by a thicker drawing oval, and also along a front outer rotation juncture 19 between front plate 11 and selector cylinder 13, which juncture was hidden from view in FIG. 1, but is now shown with a thick broken line in FIG. 12. This rotation further occurs along a rear inner rotation juncture 1201 between selector cylinder 13 and rear plate 12 and a corresponding front inner rotation juncture 1201 between front plate 11 and selector cylinder 13. These inner rotation junctures too, are illustrated with thick broken lines and were earlier hidden from view in FIG. 1. Simply put: selector cylinder 13 rotates 10 about flow selector bars 91. However, because fluid will be flowing under pressure through rotary flow valve 1, each of these outer 19 and inner 1201 rotation junctures must be suitably sealed against fluid leakage, i.e., these rotation junctures must contain a watertight seal at the same time as they permit rotation. The various options for providing such a seal using various rubberized, plasticized, etc. sleeves, gaskets, etc. will be known to those of ordinary skill in the pertinent art, and the use of such sealing options as part of this invention is thus regarded to be within the scope of this disclosure and its associated claims.

Because the rotation 10 of selector cylinder 13 about flow selector bars 91 is key to the operation of this invention, and having now developed all the key elements of the invention, we can finally begin to explore how this invention works to select how fluid is to exit rotary flow valve 1, as among central fluid exit port 30 and peripheral fluid exit ports 31, 32, 33, 34, 35, and 36.

Figure 14:
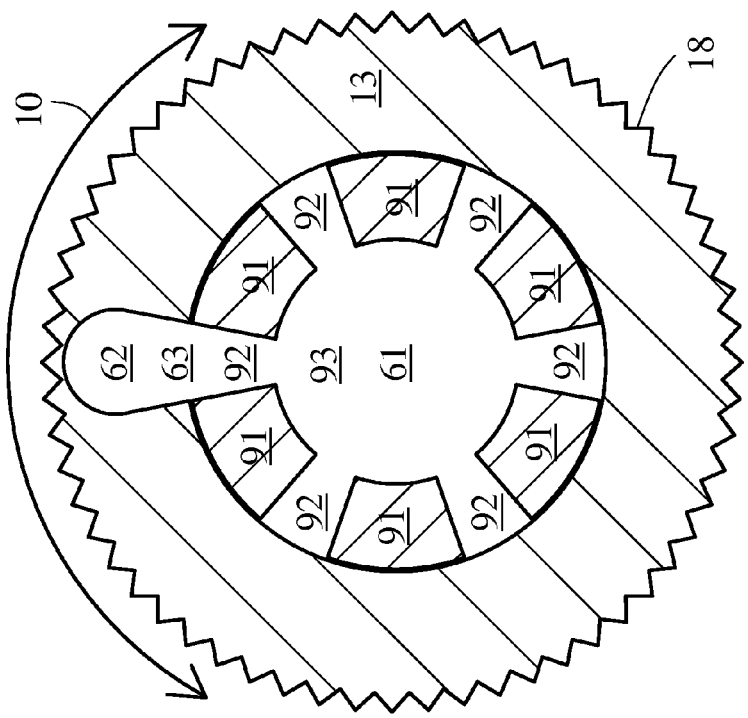
FIG. 14 is a cross-sectional view taken along the section 14-14 of FIG. 12.
Figure 13:
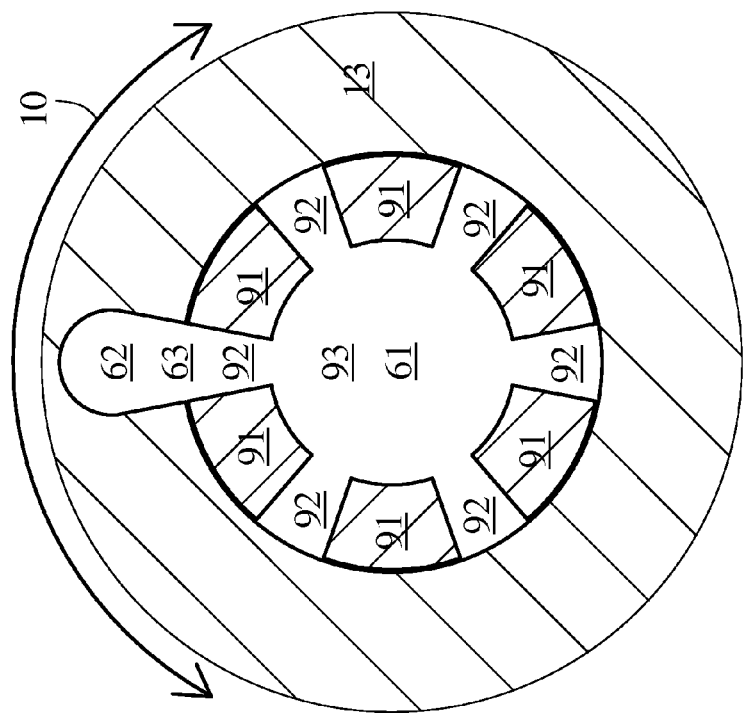
FIG. 13 is a cross-sectional view taken along the section 13-13 of FIG. 12.

Turning to FIGS. 13 and 14 we see the interior relationship between selector cylinder 13 and flow selector bars 91, taken along the views 13-13 and 14-14 of FIG. 12. These two FIGS. 13 and 14 differ only in the fact that the view of FIG. 14 is taken at the section of selector cylinder 13 which contains rotational actuator 18, while FIG. 13 may actually be taken at any section of selector cylinder 13 other than the section which contains rotational actuator 18. As has been the case in previous drawing, the absence of diagonally-hatched lines illustrates regions which are open to fluid flow, i.e., regions which contain the various "holes" which run the length of rotary flow valve 1.

The key to understanding FIGS. 13 and 14, is to regard flow selector bars 91 as being fixed, i.e., not rotating at all, and to simultaneously regard selector cylinder 13 and particularly peripheral flow channel 62 and flow channel neck 63 as rotating 10 into various rotational orientations about flow selector bars 91.

Figure 16:
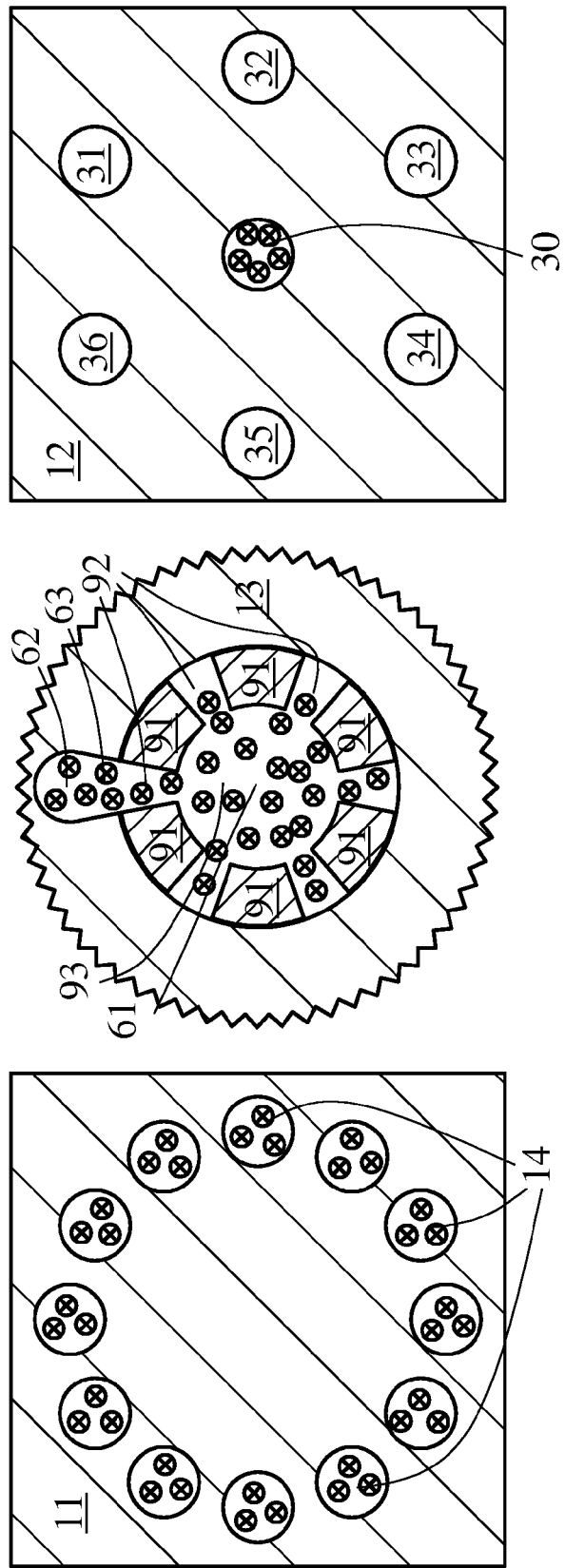
FIG. 16 illustrates in layered view, a first operational configuration of the rotary flow valve in a "central exit" configuration in which all of the fluid exits only through the central fluid exit port.

First, in the particular rotational orientation shown in FIGS. 13 and 14, see also the center illustration of FIG. 16, peripheral flow channel 62 and flow channel neck 63 align with exactly one of the inter-bar flow channels 92, namely, the inter-bar flow channel 92 situated at ninety (90) degrees in relation to the center of these Figures. Of particular importance, because of this alignment peripheral flow channel 62 is in "fluidic communication" with interior flow channel 93, via flow channel neck 63 and the particular inter-bar flow channel 92 situated at ninety (90) degrees.

Figure 17:
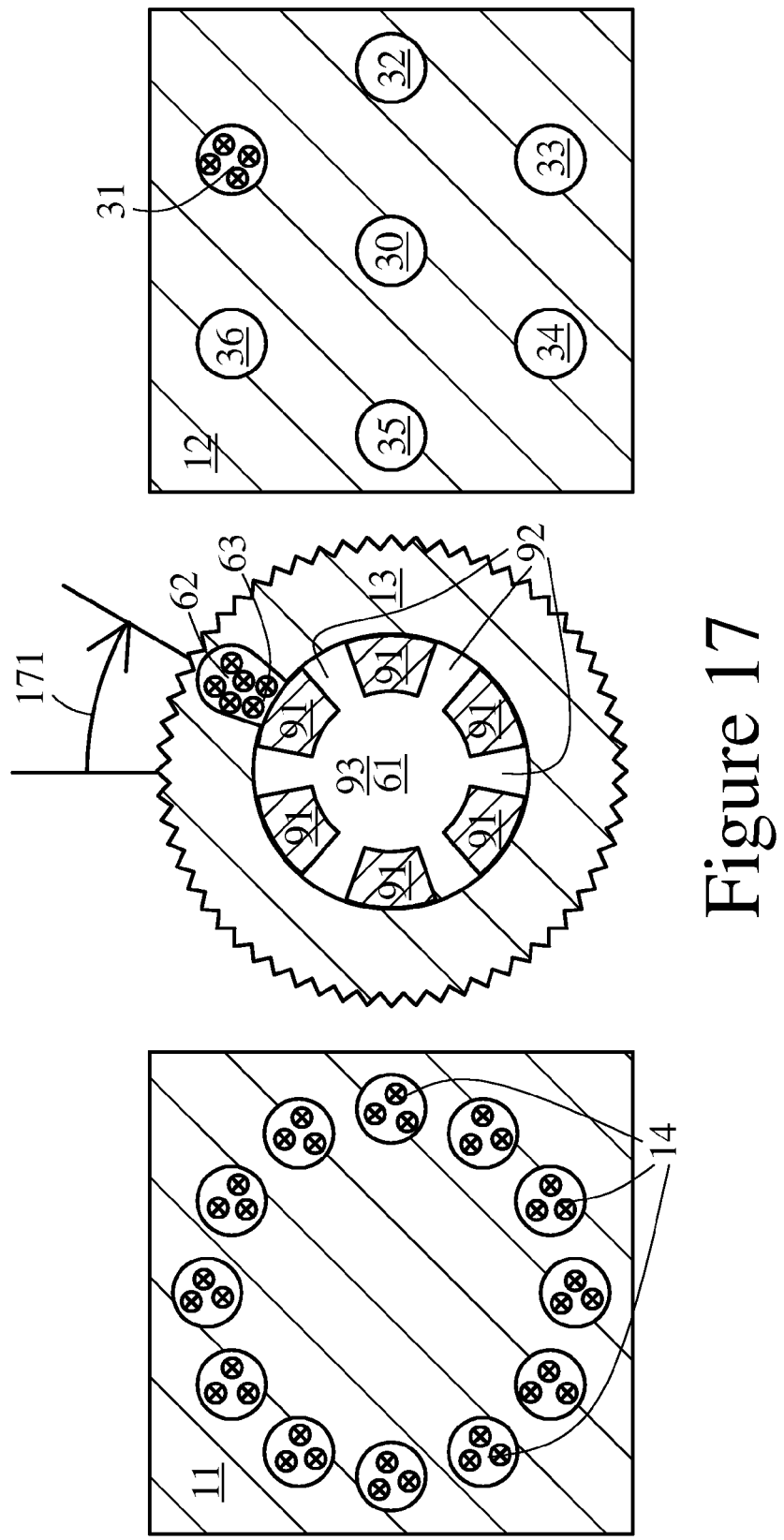
FIG. 17 illustrates in layered view, a second operational configuration of the rotary flow valve in a "peripheral exit" configuration in which all of the fluid exits only through a single one of the peripheral fluid exit ports.

Second, if one now imagines that selector cylinder 13 and particularly peripheral flow channel 62 and flow channel neck 63 are continuously rotated 10 thirty (30) degrees clockwise from what is shown in FIGS. 13 and 14, then it should be apparent that peripheral flow channel 62 and flow channel neck 63 will now align behind one of the flow selector bars 91, as is explicitly shown in the center illustration of FIG. 17. Now, peripheral flow channel 62 is blocked by the flow selector bar 91 situated at sixty (60) degrees, which is to say that flow channel 62 is now entirely cut off from fluidic communication with interior flow channel 93.

Third, and finally, if one now imagines that selector cylinder 13 and particularly peripheral flow channel 62 and flow channel neck 63 are continuously rotated 10 fifteen (15) degrees clockwise from what is shown in FIGS. 13 and 14, then it should be apparent that peripheral flow channel 62 and flow channel neck 63 will now align partially with the inter-bar flow channel 92 situated at ninety (90) degrees, and partially behind the flow selector bar 91 situated at sixty (60) degrees. This is explicitly shown in the center illustration of FIG. 18.

Now, as stated much earlier, there are three basic configurations in which fluid which has entered rotary flow valve 1 through fluid entry ports 14, exits through central fluid exit port 30 and peripheral fluid exit ports 31, 32, 33, 34, 35, and 36. The foregoing three paragraphs describe each of these respective basic configurations. First, in the "central exit" configuration, all of the fluid exits only through central fluid exit port 30. This is illustrated by FIG. 16. Second, in a "peripheral exit" configuration, all of the fluid exits only through a single one of the peripheral fluid exit ports 31, 32, 33, 34, 35, and 36. This is illustrated by FIG. 17, and the particular exit port through which fluid flows is 31. Third, in a "mixed, two-port exit" configuration, some of the fluid exits through central fluid exit port 30, and the balance of the fluid exits through exactly one and only one of peripheral fluid exit ports 31, or 32, or 33, or 34, or 35, or 36, in continuously-adjustable relative proportion. This illustrated by FIG. 18, and the exit ports are 30 and 31. Now, we are in a position to see precisely how this is effectuated by this invention of rotary flow valve 1.

Figure 15:
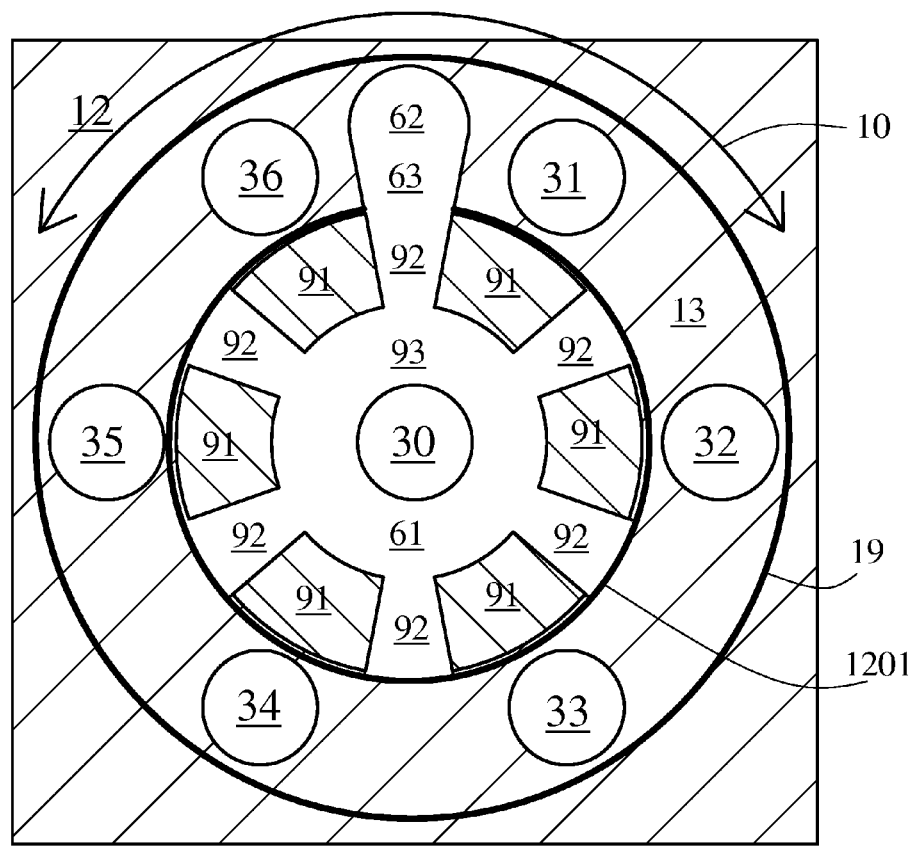
FIG. 15 is a cross-sectional view taken along the section 15-15 of FIG. 12.

FIG. 15 is a cross-sectional view along the section 15-15 of FIG. 12, taken precisely at the rotatable 10 juncture between rear plate 12 and selector cylinder 13, which is also the juncture at which flow selector bars 91 have their fixed connection with rear plate 12, and which is also the juncture at which the front openings of exit ports 30, 31, 32, 33, 34, 35, and 36 are situated. As such, this is the juncture at which all of the key operational elements converge into the configuration which underlies the operation of rotary flow valve 1. While a very small space is illustrated between flow selector bars 91 and rear inner rotation juncture 1201, this is solely for purposes of illustration to distinguish flow selector bars 91 from rear inner rotation juncture 1201. In practice, this juncture also needs to be well-sealed to prevent leakage of fluid between the flow selector bars 91 and the rear inner rotation juncture 1201, using sealing devices and methods known to those of ordinary skill, so that in practice, there is no fluidic flow permitted between the outer circumference of flow selector bars 91 and the rear inner rotation juncture 1201 which coincides with the inner circumferential surface of selector cylinder 13. As in previous cross sections, diagonal hatching shows solid areas while unhatched openings illustrate openings through which fluid may flow.

Figure 18:
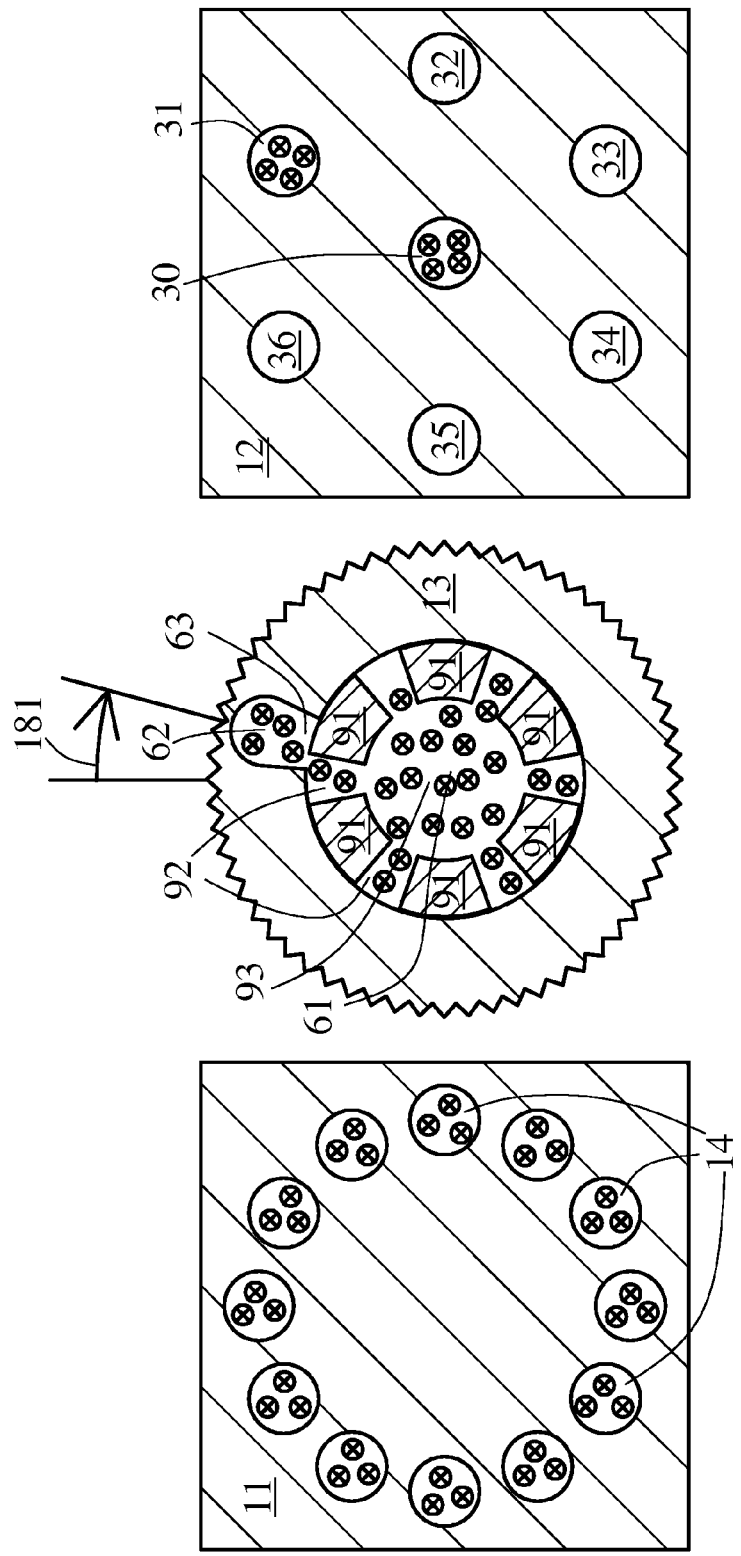
FIG. 18 illustrates in layered view, a third operational configuration of the rotary flow valve in a "mixed, two-port exit" configuration in which some of the fluid exits through the central fluid exit port and the balance of the fluid exits through exactly one and only one of the peripheral fluid exit ports.

Now let us review FIG. 16-18 more closely. FIG. 16 illustrates the first operational configuration of rotary flow valve 1 in the "central exit" configuration in which all of the fluid exits only through central fluid exit port 30. To help make clear how this occurs, we show from left to right, separate layered views from front to back of: front plate 11 comprising its plurality of fluid entry ports 14; the earlier-described FIG. 14 in which peripheral flow channel 62 is rotated 10 into the ninety (90) degree position; and rear plate 12 comprising its central fluid exit port 30 and peripheral fluid exit ports 31, 32, 33, 34, 35, and 36. The symbols consisting of an "x" surrounded by a circle are used to designate fluid flow moving into the drawing page, in the same way as this symbol is often used to indicate current flow into the page in electromagnetic diagrams.

So, in the leftmost diagram of FIG. 16, a flow of fluid is delivered under pressure to front plate 11 (in a manner to be further detailed in FIGS. 18 and 19), and therefore will naturally seek to flow through front plate 11. Of course, because front plate 11 is a solid, integral plate with the exception of fluid entry ports 14, the fluid will only pass through all of fluid entry ports 14, but will be barred from flowing through any of intermediate front plate region 15, inner front plate region 16, or outer front plate region 17, as numbered in FIG. 4.

As is next shown in the center diagram for FIG. 16, after all of fluid entry ports 14, the fluid will next encounter selector cylinder 13. Given proper sealing at the juncture between front plate 11 and selector cylinder 13, the solid body portion of selector cylinder 13 will block the fluid from continuing beyond eleven (11) of the twelve (12) fluid entry ports 14. But because peripheral flow channel 62 is rotated 10 to be in alignment with the particular fluid entry port 14 situated at the ninety (90) degree position, the fluid introduced through the particular fluid entry port 14 at the ninety (90) degree position will be permitted to continue on through peripheral flow channel 62. Because peripheral flow channel 62 is in fluidic communication with central flow channel 61 via flow channel neck 63, fluid will be free to flow through central flow channel 61, but will be blocked by the solid body of selector cylinder 13 from flowing elsewhere.

Thus, as finally shown in the rightmost diagram for FIG. 16, the only way in which fluid will be able to exit, is through central fluid exit port 30. Fluid will, in this rotational configuration, be blocked by the solid body of selector cylinder 13 from exiting through any of the peripheral fluid exit ports 31, 32, 33, 34, 35, and 36. As such, this is the "central exit" configuration, in which all of the fluid exits only through central fluid exit port 30.

While selector cylinder 13 is rotated 10 in FIG. 16 such that peripheral flow channel 62 is situated at the ninety (90) degree position, it should be apparent due to the symmetries of FIG. 16 that rotating peripheral flow channel 62 to any of the thirty (30), ninety (90), one-hundred-fifty (150), two-hundred-ten (210), two-hundred-seventy (270) and three-hundred thirty (330) degree positions will all result in a "central exit" configuration, in which all of the fluid exits only through central fluid exit port 30. It is in this sense that central fluid exit port 30 is a "special" port, and lends itself readily to being a "default" exit port.

In sum, FIG. 16 illustrates how when selector cylinder 13 is rotated 10 to a central exit configuration such that the peripheral flow channel 62 is substantially aligned with one of the inter-bar flow channels 92 and consequently is in fluidic communication with the central fluid exit port 30, fluid introduced via the fluid entry ports 14 of front plate 11 will emit through central fluid exit port 30.

FIG. 17 illustrates the second operational configuration of rotary flow valve 1 in the "peripheral exit" configuration in which all of the fluid exits only through a single one of the peripheral fluid exit ports 31, 32, 33, 34, 35, and 36. In this illustration, the exit is through fluid exit port 31. Particularly, in FIG. 17, selector cylinder 13 and therefore its peripheral flow channel 62 have been rotated 10 clockwise by thirty (30) degrees relative to the configuration of FIG. 16, as illustrated by the arc 171. Examining the flow patterns, this means that because peripheral flow channel 62 is now rotated 10 to be in alignment with the particular fluid entry port 14 situated at the sixty (60) degree position, fluid introduced through this fluid entry port 14 at the sixty (60) degree position will be permitted to continue on through peripheral flow channel 62, but that fluid introduced through any of the remaining fluid entry ports 14 will be blocked from proceeding further by the solid body of selector cylinder 13.

At the same time, peripheral flow channel 62 in this configuration is not in fluidic communication with central flow channel 61. This communication is now blocked by the particular flow selector bar 91 which is also at the sixty (60) degree position. As noted in the earlier discussion of FIG. 15, to ensure that this is a complete blockage with no leakage, there needs to be a complete fluidic seal at between the flow selector bars 91 and the rear inner rotation juncture 1201. Simultaneously, peripheral flow channel 62 in this configuration is fully aligned with fluid exit port 31, which is also situated at the sixty (60) degree position. Because of this blockage by the sixty (60) degree flow selector bar 91 and the coinciding positions of both peripheral flow channel 62 and fluid exit port 31 at the sixty (60) degrees, the entirety of the fluid flow will be completely channeled to, and exit out from, fluid exit port 31, and no other.

Given the symmetries of FIG. 17, it is also readily seen that when peripheral flow channel 62 is rotated 10 into the zero (0), one-hundred-twenty (120), one-hundred-eighty (180), two-hundred forty (240) and three-hundred (300) degree positions, the fluid will exit, respectively, through fluid exit ports 32, 36, 35, 34, and 33, which are also situated at the sane angles. As such, these are the "peripheral exit" configurations in which all of the fluid exits only through a single one of the peripheral fluid exit ports.

In sum, FIG. 17 illustrates how when selector cylinder 13 is rotated 10 to a peripheral exit configuration such that peripheral flow channel 62 is substantially aligned with a given one of the peripheral fluid exit ports (in this case, peripheral fluid exit port 31) and is blocked from fluidic communication with central fluid exit port 30 by the flow selector bar 91 corresponding with peripheral fluid exit port 31, fluid introduced via the fluid entry ports 14 of front plate 11 will emit through the given peripheral fluid exit port 31.

Finally, FIG. 18 illustrates the third operational configuration of rotary flow valve 1 in the "mixed, two-port exit" configuration in which some of the fluid exits through the central fluid exit port 30 and the balance of the fluid exits through exactly one and only one of the peripheral fluid exit ports 31, 32, 33, 34, 35, and 36. Here, selector cylinder 13 and therefore its peripheral flow channel 62 have been rotated 10 clockwise by fifteen (15) degrees relative to the configuration of FIG. 16, as illustrated by the arc 181. It will readily be appreciated that this configuration is halfway between the configurations of FIGS. 17 and 18, such that the flow selector bar 91 situated at sixty (60) degrees partially obstructs and partially permits fluidic communication between peripheral flow channel 62 and central flow channel 61 via flow channel neck 63, and such that simultaneously, peripheral flow channel 62 is partially, though not fully, aligned with fluid exit port 31. Consequently, in this configuration, part of the fluid will exit from central fluid exit port 30, while the balance will exit from peripheral fluid exit port 31. As such, this is the "mixed, two-port exit" configuration in which some of the fluid exits through the central fluid exit port and the balance of the fluid exits through exactly one and only one of the peripheral fluid exit ports. The same symmetry considerations that were discussed for FIGS. 16 and 17 in relation to all of the peripheral fluid exit ports 31, 32, 33, 34, 35, and 36, apply here as well.

In sum, FIG. 18 illustrates how when selector cylinder 13 is rotated 10 to a mixed, two-port exit configuration such that the peripheral flow channel 62 is partially aligned with one of the inter-bar flow channels 92 and in remaining part aligned with a given one of the peripheral fluid exit ports (in this case, peripheral fluid exit port 31), fluid introduced via the fluid entry ports 14 of front plate 11 will emit partially through central fluid exit port 30 and in remaining part through the given peripheral fluid exit port 31.

It will be appreciated at this time, that the ability to rotate 10 selector cylinder 13 on a continuous basis, i.e., to rotate 10 peripheral flow channel 62 to any angle whatsoever, results in the corresponding ability to fine tune in a continuous manner, the flow balance as between central fluid exit port 30, and the selected peripheral fluid exit port 31, 32, 33, 34, 35, and 36. Thus, if one were to start from the configuration of FIG. 18 and rotate 10 selector cylinder 13 and its peripheral flow channel 62 a few degrees counterclockwise, one would rebalance the fluid flow by increasing the flow rate through central fluid exit port 30 and decreasing the flow rate though peripheral fluid exit port 31. Similarly, a small clockwise rotation would do the opposite rebalancing, by decreasing the flow rate through central fluid exit port 30 and increasing the flow rate though peripheral fluid exit port 31, with similar considerations applying in other angular dispositions for peripheral fluid exit ports 32, 33, 34, 35, and 36.

As noted earlier, central fluid exit port 30 is a preferred exit port, insofar as it will emit all of the fluid in any one of six (6) rotational 10 orientations. In contrast, each of peripheral fluid exit ports 31, 32, 33, 34, 35, and 36 will emit all of the fluid in only a single rotational 10 orientation. It will also be appreciated that central fluid exit port 30 is also preferred insofar as fluid will always flow through central fluid exit port 30 whenever selector cylinder 13 is rotated 10 to divert fluid flow from one peripheral exit port to the next. Thus, if fluid at one time is flowing through peripheral fluid exit port 31, and at a later time is made to flow through peripheral fluid exit port 32, it is clear that the fluid will flow through central fluid exit port 30 in the intermediate time period while selector cylinder 13 is being rotated 10 to divert fluid flow from one peripheral exit port to the next, in this example, from 31 to 32. And, in particular, this means that under continues operation, total flow rate of fluid out from valve 1—irrespective of exit port—will be substantially constant at all times.

Most importantly, this continuous adjustment, constant flow capability while in continuous operation, is what enables rotary flow valve 1 to support extremely high pressure and high flow fluidic pumps such as those that are used to fight wildfires. Particularly, no matter what the rotational 10 orientation of selector cylinder 13, there will always be a substantially constant total flow rate out from flow valve 1 while it is continuous operation, that is, the total flow output from valve 1 while a high-flow, high-pressure pump is operating will always be substantially constant, even when valve 1 is being actuated to divert fluid flow from one place to another, because central fluid exit port 30 will be "bleeding" off the excess fluid flow and pressure while the fluid flow is being diverted from one peripheral exit port 31, 32, 33, 34, 35, and 36 to another. Put differently, during rotation 10, any increase in flow through the peripheral exit ports 31, 32, 33, 34, 35, and 36 is substantially offset by a decrease in flow through the central fluid exit port 30, while conversely, any increase in flow through the central fluid exit port 30 is substantially offset by a decrease in flow through the peripheral exit ports 31, 32, 33, 34, 35, and 36. This avoids the large pressure buildups that would otherwise occur if the flow rate was to be substantially altered during this fluid rerouting, i.e., if it was to be stopped and started, or blocked and unblocked, during the rerouting operation.

In sum, when fluid is introduced into rotary flow valve 1 at a substantially constant flow rate and pressure, the total flow rate of the fluid exiting from central fluid exit port 30 plus fluid exiting from the peripheral fluid exit ports is maintained by rotary flow valve 1 to be substantially constant even while selector cylinder 13 is being rotated 10 from one rotational orientation to another rotational orientation. This avoids pressure spikes during operation, and lays the foundation for the effective use of this rotary flow valve 1 in high-pressure, high-flow rate applications such as but not limited to fighting wildfires.

With all of the foreign discussion, we have now described in detail, the essential aspects of rotary flow valve 1. Now we review other related aspects of this invention.

Figure 19:
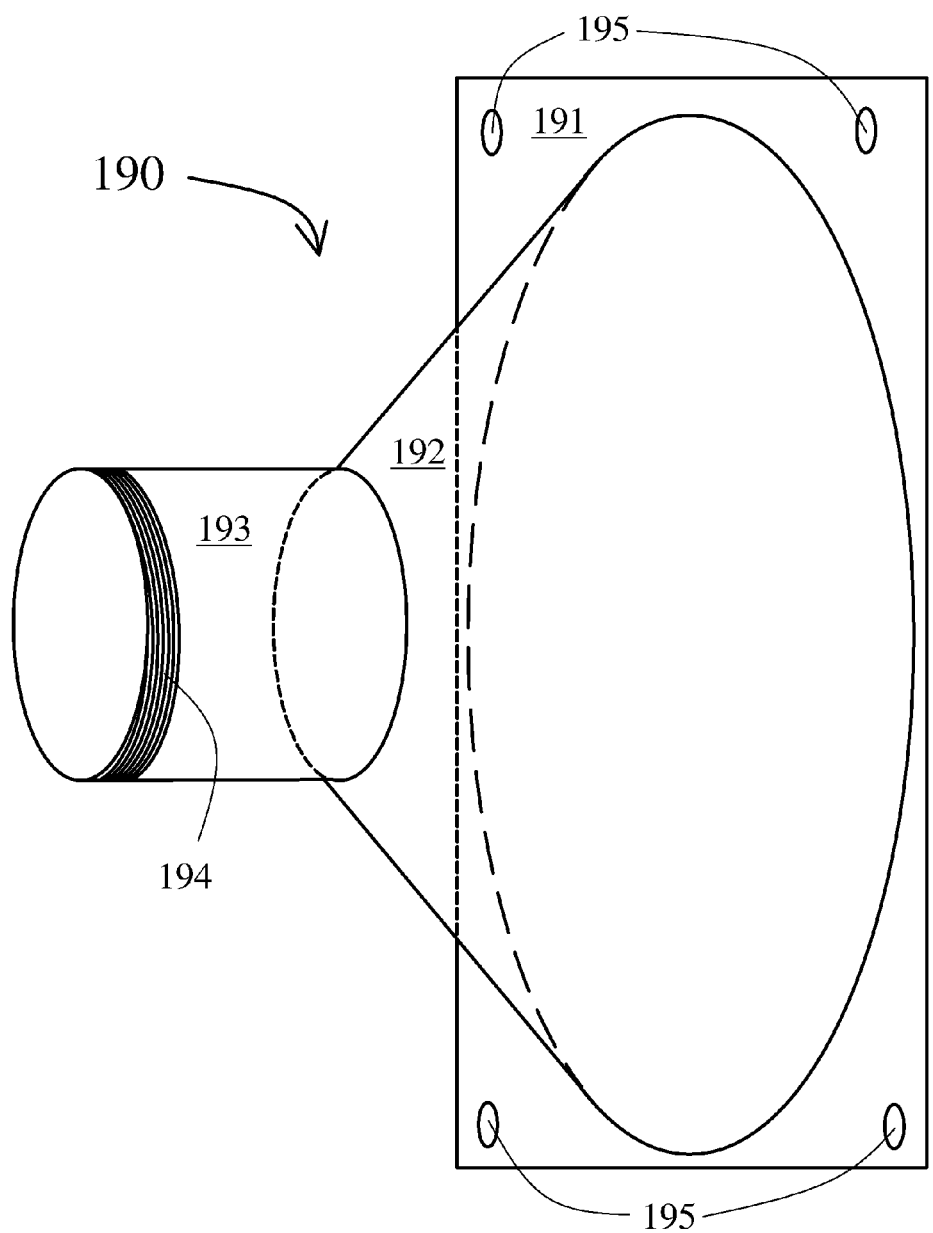
FIG. 19 is side-front perspective view illustrating one preferred, non-limiting variation for an incoming fluid supply assembly, which is attached to the front of the of the rotary flow valve for feeding incoming fluid into the rotary flow valve of FIG. 1.

As has been mentioned previously, a flow of fluid is delivered under pressure to front plate 11, and then makes its way through fluid entry ports 14 into the rotary flow valve 1 and eventually exits through central fluid exit port 30 and/or one of peripheral fluid exit ports 31, 32, 33, 34, 35, and 36 depending on the angular orientation of selector cylinder 13 which rotates 10 via external actuation 18, as has been previously described and disclosed. FIG. 19 illustrates one preferred variation for an incoming fluid supply assembly 190, which is attached to the front of rotary flow valve 1 and preferably to front plate 11 for delivering this fluid under pressure to all of the fluid entry ports 14.

As shown in FIG. 19, fluid supply assembly 190 comprises a fluid supply plate 191 designed to sealably attach, preferably to, and at least proximate to, front plate 11, via a schematically-illustrated attachment 195 that can include any of a number of know attachment means known in the art, e.g., screws, bolds, welds, etc. A fluid supply port 193 is configured to mate via a standard (or even non-standard if desired for a particular usage) fitting 194 with a fluid supply device such as a hose or a pipe or any other fluid conduit. Incoming fluid introduced under pressure via fluid supply port 193 then travels into a fluid supply chamber 192 for distribution to front plate 11 and its fluid entry ports 14.

FIG. 20 shows fluid supply plate 191 once is has been attached 195 to the front of rotary flow valve 1, with suitable seal 201, illustrated by the thicker line in FIG. 20. It should be apparent from all of the foregoing discussion that this configuration will indeed serve to deliver pressurized incoming fluid 202 to front plate 11 and its fluid entry ports 14, for routing by rotary flow valve 1 through the various exit ports in the manner previously described.

Figure 21:
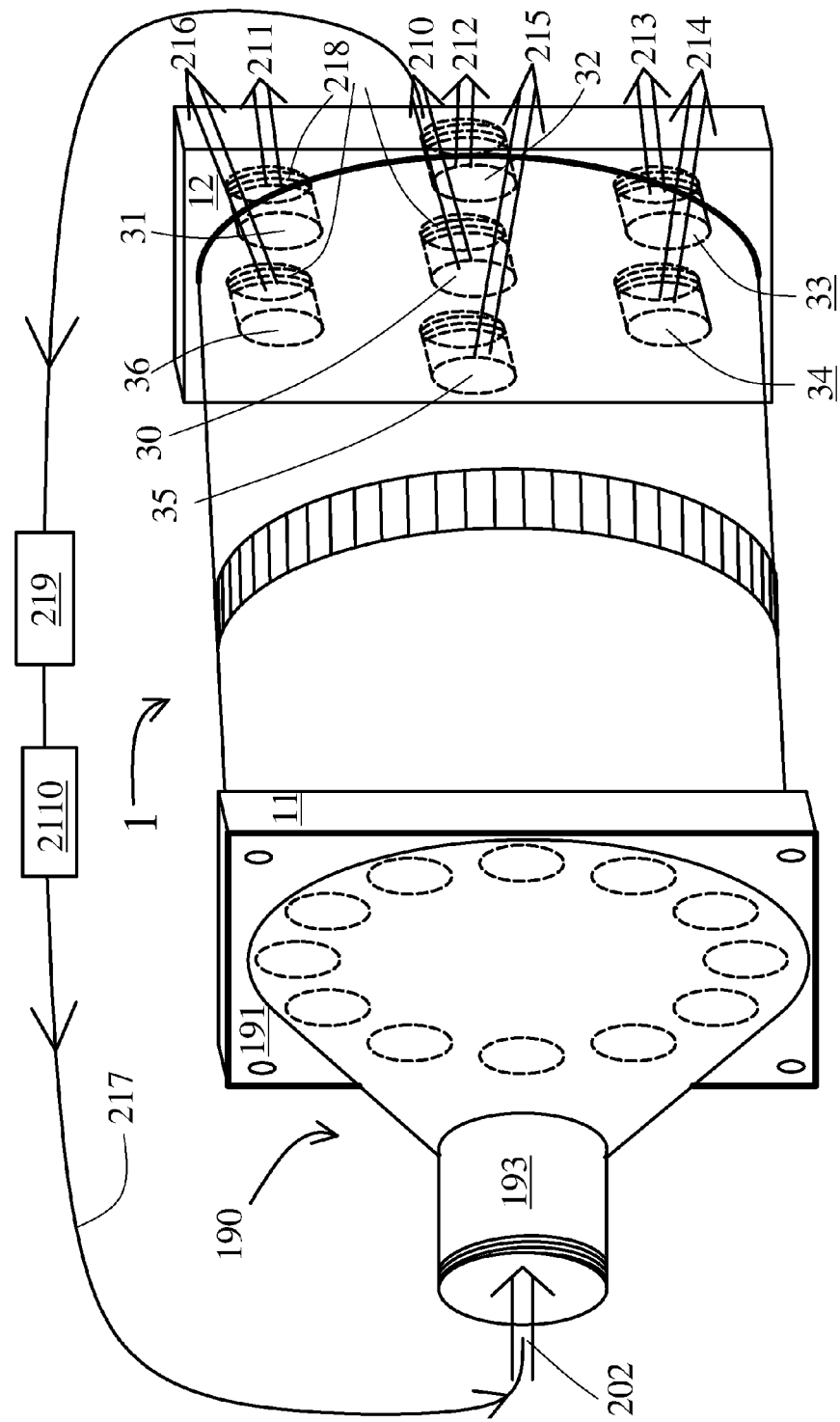
FIG. 21 illustrates the flow of fluid into and out from the rotary flow valve and fluid supply assembly of FIG. 20, including a continuous flow recirculation/feedback loop.

FIG. 21 illustrates the flow of fluid into and out from the rotary flow valve 1 and fluid supply assembly 190 of FIG. 20. FIG. 21 shows with broken lines, the central fluid exit port 30 and the peripheral fluid exit ports 31, 32, 33, 34, 35, and 36 which are hidden from view in FIG. 20. Each of these exit ports is now also illustrated to be configured to mate via a standard (or, again, non-standard, if desired) fitting 218 with a fluid egress conduit, again, such as a hose or a pipe or any other fluid conduit. The exit flow of fluid is schematically illustrated by the outflow arrows 210 through 216, flowing out from exits ports 30 through 36 respectively.

Now, keep in mind, as already discussed, that central fluid exit port 30 is a "special" exit port insofar as fluid will egress exclusively from central fluid exit port 30 in any of six different positions of rotation 10 of selector cylinder 13, and in other configurations, may share an egress of fluid with precisely one of the peripheral fluid exit ports 31, 32, 33, 34, 35, and 36. And, keep in mind, as also just discussed, that as the fluid flow is routed from one of the peripheral fluid exit ports 31, 32, 33, 34, 35, and 36 to the next, the fluid will egress from central fluid exit port 30 during the intermediate rotation between any two adjacent peripheral fluid exit ports 31, 32, 33, 34, 35, and 36, maintaining a substantially constant rate of total outflow during continuous operation.

Given this, it is possible, though not required, to establish a continuous flow recirculation loop 217, recycling fluid exiting from central fluid exit port 30 back into fluid supply port 193, as schematically illustrated in FIG. 21. Inline with recirculation loop 217 in this configuration are a schematically illustrated fluid reservoir 219 and a fluidic pumping device 2110 for delivering fluid under pressure to the fluid supply port 193. In the event that this sort of feedback loop is established, then the overall system of FIG. 21 would work as follows: While power to the pump 2110 is left on so that the pump is in continuous operation, as a default, rotary flow valve 1 is set into a rotational 10 position to cause fluid to exit through central fluid exit port 30. Thus, in this default configuration, fluid is continuously recycling from exit port 30 back into fluid reservoir 219, and then is pumped 2110 back into fluid supply port 193. Then, when it is desired to break the feedback loop and route water elsewhere—e.g., to one of six other locations in the illustrated embodiment with six peripheral fluid exit ports 31, 32, 33, 34, 35, or 36—selector cylinder 13 is rotated 10 into the proper angular orientation to direct the fluid as desired. In this continuous flow recirculation configuration, fluid leaving the valve 1 can be applied (switched or routed) to one of several desired locations (via ports 31, 32, 33, 34, 35, or 36) or returned to the source of the fluid (via port 30).

That is, continuous flow recirculation loop comprises a fluid reservoir 219, a first flow conduit (unnumbered) connecting the central fluid exit port 30 to the reservoir 219, a second flow conduit (unnumbered) connecting the reservoir 219 to the fluid supply port, and a pumping device for providing the pressure to the fluid introduced the fluid supply port.

In this recirculation configuration, one operates rotary flow valve 1 by maintaining fluidic pumping device 2110 in a state of continuous operation. While valve 1 is in the default setting, fluidic pumping device 2110 keeps pumping, but without distributing fluid through any peripheral fluid exit ports 31, 32, 33, 34, 35, or 36. In this default configuration, rotary flow valve 1 is kept in the central exit configuration of FIG. 16 such that the fluid is continuously recirculating out of and back into fluid reservoir 219. Importantly, this default configuration (recirculation) is what enables the use of gas powered water pumps to be used unmanned. Only when it is desired to emit the fluid through a given one of the peripheral fluid exit ports, is the selector cylinder rotated 10 to the peripheral exit configuration of FIG. 17 or to the mixed, two-port exit configuration of FIG. 18.

Thus, in this recirculation configuration, rotary flow valve 1 with recirculation loop 217 enables the further development of unmanned water delivery systems which would allow advances in fire protection technology for buildings and property during wild fires. Specifically, in areas that are prone to wild fires such as California, Arizona, and other southwest states, building protection systems could be installed during new construction and integrated with swimming pool construction, or could be installed temporarily ahead of advancing wild fires using swimming pool water or other water sources such as ponds, lakes, rivers, streams, hot tubs, or temporary bladder tanks installed and filled for the fire event. The temporary systems, if used, would be removed after the fire passes and later redeployed.

Such systems would preferably use a fluidic pumping device 2110 comprising a gas powered high pressure, high flow water pump designed for remote firefighting. These are high flow, high-pressure fluidic pumping devices rated for operation of at least 75 gallons per minute and of at least 75 psi, and more typically, they operate at about 100 gallons a minute and at 100 psi, or more. Such systems could further employ mechanized water guns designed for this application, with control module 110 comprising, for example not limitation, an encoded gear motor with a programmable logic controller (PLC), directing both the constant rotary flow valve 1 and the mechanized water guns. The mechanized water guns should preferably be capable of deploying both water and fire retardant foam. Control module 110 could receive direction electronically from offsite personnel or be programmed to interpret real-time onsite data sensed via suitable sensor devices, and direct the valve and firefighting effort. The fact that the total outflow from rotary flow valve 1 is substantially constant irrespective of the angular orientation of selector cylinder 13, is what enables such high pressure, high flow water pumps to be employed to utilize this invention for fighting wildfires, because there are substantially no pressure spikes as the valve 1 is actuated from one rotational 10 configuration to another. In practice, this flow constancy is maximized by fabricating the angular widths of the flow selector bars 91 to be slightly larger than the diameters of peripheral exit ports 31, 32, 33, 34, 35, and 36, so that as soon as peripheral flow channel 62 is moved away from the FIG. 17 alignment with one of the peripheral exit ports 31, 32, 33, 34, 35, and 36 thereby startup to constrict flow to that peripheral exit port, a compensating, pressure relieving flow will start to occur through an inter-bar flow channel 92 and out the central fluid exit port 30.

An unmanned water delivery system as described above for wild fires could also provide cooling water or water mist at a nuclear power plant disaster where electricity to the facility and cooling water to reactors has been interrupted and where human exposure to radiation must be minimized, such as recently would have been desirable at the Japanese Fukushima Daiichi power plant.

Rotary flow valve 1 with recirculation loop 217 can be generally applied wherever output from a single water supply line requires change in water flow, including, but not limited to, agriculture irrigation control, water fountain displays, and water amusement park rides.

For example, one might use rotary flow valve 1 with recirculation loop 217 in the operation of a decorative water fountain where water is sprayed over time out of different various outlets to create desired artistic visual effect. In the default mode, water would be sprayed out of one particular primary fountain location (via central fluid exit port 30), but with a "choreographed" and/or "programmed" rotation 10 of selector cylinder 13, water can be sprayed out from other outlets with desired sequence and timing so as to create the desired artistic, visual effect. Obviously, for this application, or for similar applications which do not require large water throughputs as does fighting wildfires, one can use pumps operating at lower flow rates and pressures.

For another example, one might use rotary flow valve 1 with recirculation loop 217 to route irrigation on a cyclical basis to several crops on a farm, or only to certain fields or locations which require water. When no watering is needed, the pump 2110 continues to operate, but water is simply recirculate out of and back into the reservoir 219.

Of course, rotary flow valve 1 may also be used without recirculation loop 217, in which case it is simply (in the embodiment developed herein) a seven-exit port rotary flow valve with one preferred port (central fluid exit port 30) and six non-preferred ports (peripheral fluid exit ports 31, 32, 33, 34, 35, and 36), which is continuously adjustable, which permits outflow to be simultaneously shared between the preferred port and exactly one of the non-preferred ports, which is ready actuated 18 from an entirely external point of physical contact, and which enables a substantially constant total fluidic output regardless of the particular fluidic routing at any given point in time.

Finally, as noted earlier, the illustrated arrangement of fluid entry ports 14 running through front plate 11 in FIG. 1 (and also FIGS. 2 and 4) is merely illustrative, and not limiting, and a virtually unlimited number of arrangements of fluid entry ports 14 may be employed within the scope of this disclosure and its associated claims. As was also noted earlier, first, for purposes of this disclosure, it was simplest to explain the invention using the particular arrangement illustrated in FIG. 1. This was because the angular correspondences at various angular multiples of thirty (30) degrees as between the fluid entry ports 14 and the peripheral fluid exit ports 31, 32, 33, 34, 35, and 36 greatly simplified the process of merely explaining the operation of this invention in this disclosure. And, as was also noted earlier, in operation, when the fluid entry ports 14 are the same size and shape and (for every other fluid entry port 14) are inline with the peripheral fluid exit ports, one achieves maximum flow through the rotary flow valve 1 with the least back pressure.

Nonetheless, there are still a virtually unlimited number of arrangements of fluid entry ports 14 may be employed within the scope of this disclosure and its associated claims. Thus, to highlight this point, FIG. 22, for example, not limitation, shows a cross-sectional view of an alternative embodiment for fluid entry ports 14 running through front plate 11. The reader who has followed this disclosure and understood the operation of this invention will appreciate that all that is really necessary is for front plate 11 to pass the water through the circumferential region defined by fluid entry ports 14 and to block water from passing through intermediate front plate region 15, while at the same time presenting a unitary plate with structural integrity to which incoming fluid supply assembly 190 may be readily attached, preferably but not by requirement to the outer front plate region 17, so as to deliver fluid under pressure to the fluid entry ports 14.

Figure 23:
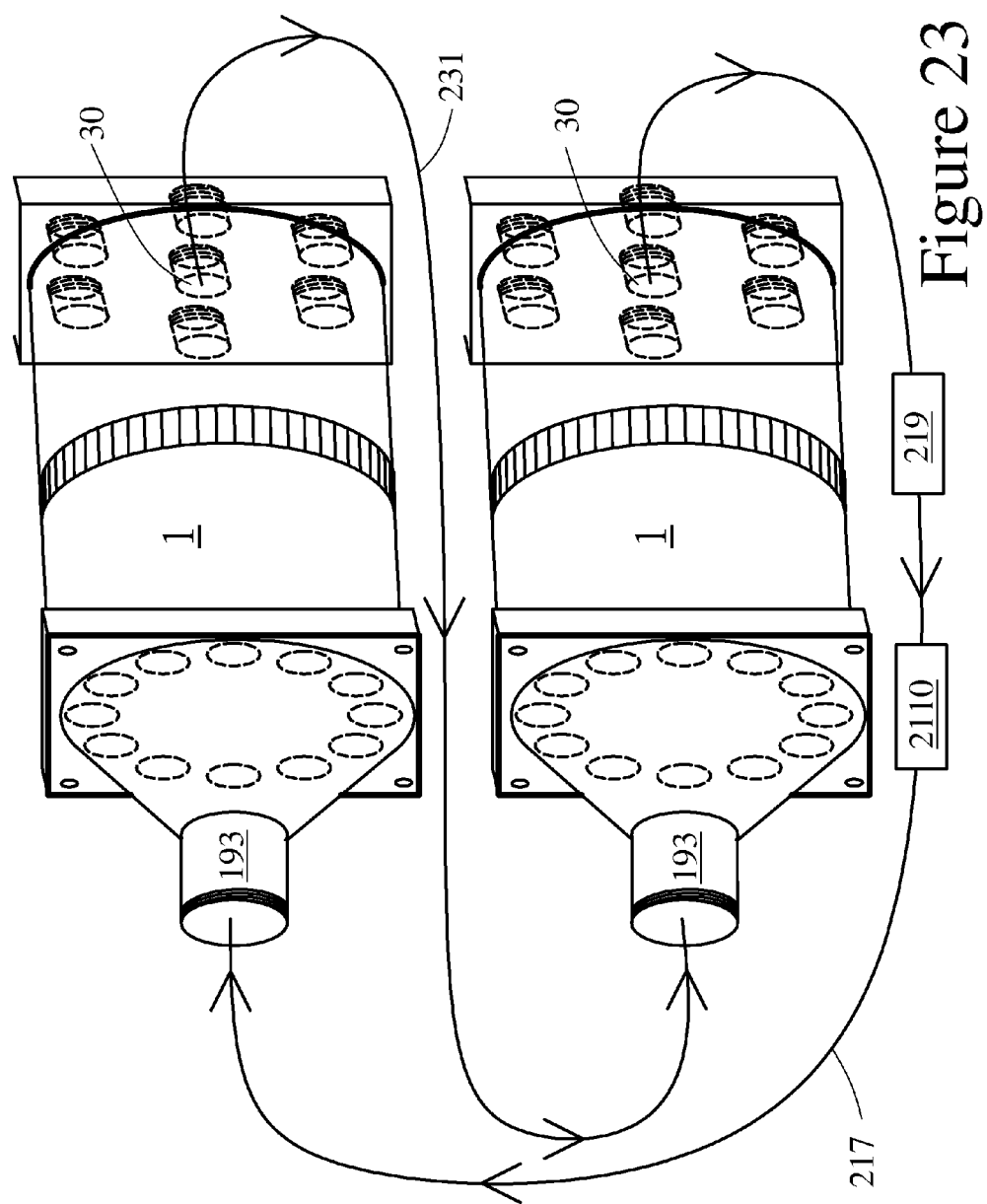
FIG. 23 is a side-front perspective view illustrating two rotary flow valves connected in series as one alternative way to increase (in this case, double) the number of peripheral fluid exit ports.

It was discussed earlier in connection with FIG. 1 that there may be as few as one (1) or two (2) and as many as twelve (12) peripheral fluid exit ports on a single valve 1. As an alternative to fabricating valves 1 with a larger number of peripheral fluid exit ports, FIG. 23 shows two rotary flow valves connected in series in order to double the number of peripheral fluid exit ports. In this non-limiting example, two (2) six-port valves are connected in series, providing a total of twelve (12) peripheral fluid exit ports. The effluent from the central fluid exit port 30 of the first valve 1 (top of the drawing) is connected in series to a fluid supply port 193 of the second valve 1 (bottom of the drawing) via a series flow conduit 231 and so doubles the number of peripheral fluid exit ports from six (6) to twelve (12). In a variation of the FIG. 21 configuration, the effluent from a central fluid exit port 30 of the second valve 1 is in turn connected via continuous flow recirculation loop 217 back to the fluid supply port 193 of the first valve 1. When the first valve 1 is rotated 10 into a configuration wherein all of the fluid is emitted from its central fluid exit port 30, then rotation 10 of the second valve to direct fluid to one of its peripheral fluid exit ports provides the ability to direct fluid to one of six (6) of its twelve (12) available locations. When the first valve 1 is rotated 10 into a configuration wherein all of the fluid is emitted from one of its peripheral fluid exit ports, this will cut off any flow to the second valve 1 and direct fluid to one of its remaining six (6) of the twelve (12) available locations. When both valves 1 are rotated into central exit configurations, the fluid simply recycles out from and back into the reservoir 219.

In sum, the rotary flow valve system illustrated in FIG. 23 comprises a first rotary flow valve 1, a second rotary flow valve 1, a series flow conduit 231 connecting the central fluid exit port 30 of the first rotary flow valve to a fluid supply port 193 of the second rotary flow valve 1, and a continuous flow recirculation loop 217 in turn comprising fluid reservoir 219, a first flow conduit (unnumbered) connecting a central fluid exit port 30 of the second rotary flow valve 1 to reservoir 219, a second flow conduit (unnumbered) connecting reservoir 219 to a fluid supply port 193 of the first rotary flow valve 1, and a fluidic pumping device 2110 for delivering fluid under pressure from the reservoir 219 to the fluid supply port 193 of the first rotary flow valve 1. The total number of peripheral fluid exit ports available from these rotary flow valves 1 in series is equal to the sum of the number of peripheral fluid exit ports of the first rotary flow valve 1 plus the number of peripheral fluid exit ports of the second rotary flow valve 1.

It is understood that two or more valves 1 may be connected in series in like manner, and therefore that the illustration of FIG. 23 is non-limiting as to the number of such valves 1 which may be placed in series. In general, if each of N valves has P peripheral fluid exit ports, then a series configuration of these valves in the manner illustrated in FIG. 23 will yield a total of N×P peripheral fluid exit ports to service any one of N×P locations. And, if the number of peripheral fluid exit ports in each valve differs, say, for example, that there are $P_1$ peripheral fluid exit ports in valve 1, $P_2$ peripheral fluid exit ports in valve 2, and $P_N$ peripheral fluid exit ports in valve N, then there will be a total of $P_1+P_2+\ldots P_N$ peripheral fluid exit ports available from a series of these N valves.

The foregoing series configurations could—depending on port position—actually provide faster response times than if one were to utilize a single valve with a larger number of peripheral fluid exit ports. These series configurations also highlight the extreme versatility of valve 1, wherein placing two like valves 1 in series immediately provides the equivalent of a single valve with twice the number of peripheral fluid exit ports, while keeping the diameter of each port unchanged. This makes it possible to create high-flow rate systems servicing a large number of locations, because one can simultaneously provide large cross sectional diameters for fluid flow, a large number of fluid delivery locations, and yet, utilize a series of valves 1 which are each still limited to manageable diameter. For example, if one is seeking to have twelve locations serviced by industrial fire hoses which are 4 to 5 inches in diameter, one can do so with three four (peripheral) port valves rather than one twelve port valve, and keep the overall diameter of each valve to a manageable size. (Specifically, in this example, counting the diameter taken by central fluid exit port 30, the lower limit for the entire diameter of each four-port valve would be 4 inches per port×3 collinear ports=12 inches, to 5 inches per port×3 collinear ports=15 inches. For a single twelve (peripheral) port valve, thinking about the geometry of a 12 port layout, the lower limit on the outer circumference of the valve would be 12 co-circumferential ports×(4 inches per port circumferentially+2 inches per port axially)=72 inches, to 12 co-circumferential ports×(5 inches per port circumferentially+2 inches per port axially)=84 inches, which translates to a lower limit of $72/\pi$=approximately 23 inches in diameter, to $84/\pi$=approximately 26.75 inches in diameter. That is, one would achieve the exact same service using valves 1 that are at minimum 12 rather than 23 inches in diameter, to 15 rather than 26.75 inches in diameter.)

While it should be clear that the effluent from the central fluid exit port 30 (rather than a peripheral fluid exit port) of an "earlier" valve 1 in a series should be connected to the fluid supply port 193 of the successive "later" valve 1 in the series in order to yield the foregoing increases in the number of peripheral fluid exit ports, this does not preclude a user from connecting the effluent from the peripheral fluid exit port of an earlier valve to the fluid supply port 193 of a later valve in the series, if user perceives some advantage to be derived from doing so. Similarly, while we have reviewed the possibility of connecting valves 1 in series, this does not preclude the possibility of connecting them in parallel if the use perceives an advantage in doing so.

Note that while the peripheral flow channel 62 (absent the channel neck 63) and fluid exit ports 30, 31, 32, 33, 34, 35, and 36 and have been illustrated to have a substantially circular shape, this is also strictly for illustration and does not in any way limit the shape of these elements. Also, while it has been emphasized at a number of points in this disclosure that seals, gaskets, etc. such as are known in the art are to be employed to prevent fluid leakage at certain critical junctures, it is to be understood as a general principle that for this invention to be fabricated and properly practiced, it will be important to provide suitable seals as required including at locations that may not be specifically identified herein, and that a person of ordinary skill seeking to practice this invention will be readily capable of determining where seals are needed and of what material nature these seals ought to be for optimum performance.

As noted earlier, control module 110 such but not limited to as an encoded gear motor with a programmable logic controller (PLC) is electronically programmed for controlling actuation of the rotation 10 of selector cylinder 13 around the flow selector bars 91 detailed in FIG. 9, thereby electronically controlling the exiting of fluid among the central fluid exit port 30 and the peripheral fluid exit ports 31, 32, 33, 34, 35, and 36 according to this electronic programming. This programming will of course be dependent on the particular application in which rotary flow valve 1 is utilized. Such encoded gear motors, as is known to those of ordinary skill in the art, are routinely used in mechanical processes requiring movements of machinery at varying distances or to varying positions, with these movements being random and/or unordered. These motors are controlled by programmable logic controllers which have sensor inputs, make programmed decisions and provide direction to the encoded gear motor. The rotary flow valve 1 would interface directly with the encoded gear motor to establish matching gear positions of rotational actuator 18 on selector cylinder 13, or would interface indirectly using a gear belt much like an automobile engine timing belt. Programmable logic controllers are designed/programmed specifically for their particular intended application, using methods well known in the art.

The knowledge possessed by someone of ordinary skill in the art at the time of this disclosure is understood to be part and parcel of this disclosure and is implicitly incorporated by reference herein, even if in the interest of economy express statements about the specific knowledge understood to be possessed by someone of ordinary skill are omitted from this disclosure. While reference may be made in this disclosure to the invention comprising a combination of a plurality of elements, it is also understood that this invention is regarded to comprise combinations which omit or exclude one or more of such elements, even if this omission or exclusion of an element or elements is not expressly stated herein, unless it is expressly stated herein that an element is essential to applicant's combination and cannot be omitted. It is further understood that the related prior art may include elements from which this invention may be distinguished by negative claim limitations, even without any express statement of such negative limitations herein. It is to be understood, between the positive statements of applicant's invention expressly stated herein, and the prior art and knowledge of the prior art by those of ordinary skill which is incorporated herein even if not expressly reproduced here for reasons of economy, that any and all such negative claim limitations supported by the prior art are also considered to be within the scope of this disclosure and its associated claims, even absent any express statement herein about any particular negative claim limitations.

Finally, while only certain preferred features of the invention have been illustrated and described, many modifications, changes and substitutions will occur to those skilled in the art. It is, therefore, to be understood that the appended claims are intended to cover all such modifications and changes as fall within the true spirit of the invention.

I claim:

1. A rotary flow valve apparatus, comprising:
   a front plate comprising a plurality of fluid entry ports running therethrough;
   a rear plate comprising one central fluid exit port running through a substantial center thereof and P peripheral fluid exit ports running through a substantially circumferential periphery thereof, where P is greater than or equal to 1;
   P flow selector bars integrally connecting said front plate with said rear plate and fixing said front plate relative to said rear plate, each of said P flow selector bars corresponding on a one-to-one basis with one of said P peripheral fluid exit ports and angularly positioned relative to said central fluid exit port at substantially the same angle as its corresponding peripheral fluid exit port;
   P inter-bar flow channels defined between rotationally-adjacent pairs of said flow selector bars;
   a selector cylinder comprising a solid cylinder body, a central flow channel running therethrough, a peripheral flow channel running therethrough, and a flow channel neck running therethrough, said flow channel neck providing unimpeded fluidic communication between said peripheral flow channel and said central flow channel; and
   said selector cylinder seated over and freely and continuously rotatable around said flow selector bars and relative to said front and rear plates.

2. The rotary flow valve of claim 1, wherein:
   when said selector cylinder is rotated to a central exit configuration such that said peripheral flow channel is substantially aligned with one of said inter-bar flow channels and consequently is in fluidic communication with said central fluid exit port, fluid introduced via said fluid entry ports of said front plate will emit through said central fluid exit port;
   when said selector cylinder is rotated to a peripheral exit configuration such that said peripheral flow channel is substantially aligned with a given one of said peripheral fluid exit ports and is blocked from fluidic communication with said central fluid exit port by the corresponding flow selector bar, fluid introduced via said fluid entry ports of said front plate will emit through said given one of said peripheral fluid exit ports; and
   when said selector cylinder is rotated to a mixed, two-port exit configuration such that said peripheral flow channel is partially aligned with said one of said inter-bar flow channels and in remaining part aligned with a given one of said peripheral fluid exit ports, fluid introduced via said fluid entry ports of said front plate will emit partially through said central fluid exit port and in remaining part through said given one of said peripheral fluid exit ports.

3. The rotary flow valve of claim 1, wherein said P is greater than or equal to 2 and said P is less than or equal to 12.

4. The rotary flow valve of claim 1, wherein said selector cylinder is capable of being so-rotated solely by physical actuation against an exterior surface of said selector cylinder.

5. The rotary flow valve of claim 1, wherein when fluid is introduced into said rotary flow valve at a substantially constant flow rate and pressure, the total flow rate of the fluid exiting from said central fluid exit port plus fluid exiting from said peripheral fluid exit ports is maintained by said rotary flow valve to be substantially constant even while said selector cylinder is being rotated from one rotational orientation to another rotational orientation, because during said rotation, any increase in flow through said peripheral exit ports is substantially offset by a decrease in flow through said central fluid exit port, while conversely, any increase in flow through said central fluid exit port is substantially offset by a decrease in flow through said peripheral exit ports.

6. The rotary flow valve of claim 1, further comprising a high flow, high-pressure fluidic pumping device rated for operation of at least 75 gallons per minute and of at least 75 psi, configured to deliver fluid under pressure into a fluid supply port of said rotary flow valve.

7. The rotary flow valve of claim 1, further comprising a fluid supply assembly configured to receive fluid under pressure via a fluid supply port thereof and introduce said fluid under pressure to said fluid entry ports of said front plate.

8. The rotary flow valve of claim 1, further comprising a continuous flow recirculation loop, said a continuous flow recirculation loop in turn comprising:
   a fluid reservoir;
   a first flow conduit connecting said central fluid exit port to said reservoir;
   a second flow conduit connecting said reservoir to a fluid supply port of said rotary flow valve; and
   a fluidic pumping device for delivering fluid under pressure from said reservoir to a fluid supply port of said rotary flow valve.

9. The rotary flow valve of claim 8, wherein:
   when said fluidic pumping device is maintained in a state of substantially continuous operation, keeping said rotary flow valve in a central exit configuration as a default causes the fluid to continuously recirculate out of and back into said fluid reservoir while in this default configuration; and
   only when it is desired to emit the fluid through a given one of P peripheral fluid exit ports, rotating said selector cylinder to said peripheral exit configuration or to said mixed, two-port exit configuration causes the fluid to be emitted through said given one of P peripheral fluid exit ports.

10. The rotary flow valve of claim 8, said fluidic pumping device comprising a high flow, high-pressure fluidic pumping device rated for operation of at least 75 gallons per minute and of at least 75 psi, configured to introduce fluid into said fluid supply port.

11. The rotary flow valve of claim 8, further comprising a fluid egress conduit connected to one of said peripheral fluid exit ports for delivering fluid output from said one of said peripheral fluid exit ports to a potential fire location where said fluid output can be used without human presence to fight a potential fire.

12. The rotary flow valve of claim 1, further comprising a control module electronically programmed for controlling actuation of the rotation of said selector cylinder around said flow selector bars, thereby electronically controlling the exiting of fluid among said central fluid exit port and said peripheral fluid exit ports according to said electronic programming.

13. A rotary flow valve system comprising a plurality of rotary flow valves connected in series, said system comprising:
   at least a first rotary flow valve as specified in claim 1 and a second rotary flow valve as specified in claim 1;

a series flow conduit connecting said central fluid exit port of said first rotary flow valve to a fluid supply port of said second rotary flow valve; and
a continuous flow recirculation loop in turn comprising:
a fluid reservoir;
a first flow conduit connecting a central fluid exit port of said second rotary flow valve to said reservoir;
a second flow conduit connecting said reservoir to a fluid supply port of said first rotary flow valve; and
a fluidic pumping device for delivering fluid under pressure from said reservoir to said fluid supply port of said first rotary flow valve; wherein:
the total number of peripheral fluid exit ports available from said rotary flow valves in series is equal to the sum of the number of peripheral fluid exit ports of said first rotary flow valve plus the number of peripheral fluid exit ports of said second rotary flow valve.

14. A central valve assembly apparatus for use in a rotary flow valve, said central valve assembly comprising:
a front plate comprising a plurality of fluid entry ports running therethrough;
a rear plate comprising one central fluid exit port running through a substantial center thereof and P peripheral fluid exit ports running through a substantially circumferential periphery thereof, where P is greater than or equal to 1;
P flow selector bars integrally connecting said front plate with said rear plate and fixing said front plate relative to said rear plate, each of said P flow selector bars corresponding on a one-to-one basis with one of said P peripheral fluid exit ports and angularly positioned relative to said central fluid exit port at substantially the same angle as its corresponding peripheral fluid exit port; and
P inter-bar flow channels defined between rotationally-adjacent pairs of said flow selector bars.

15. A method for assembling a rotary flow valve, said method comprising:
providing a front plate comprising a plurality of fluid entry ports running therethrough;
providing a rear plate comprising one central fluid exit port running through a substantial center thereof and P peripheral fluid exit ports running through a substantially circumferential periphery thereof, where P is greater than or equal to 1;
providing a selector cylinder comprising a solid cylinder body, a central flow channel running therethrough, a peripheral flow channel running therethrough, and a flow channel neck running therethrough, said flow channel neck providing unimpeded fluidic communication between said peripheral flow channel and said central flow channel;
providing P flow selector bars, each of said P flow selector bars corresponding on a one-to-one basis with one of said P peripheral fluid exit ports;
seating said selector cylinder over and around said flow selector bars;
angularly positioning each of said P flow selector bars relative to said central fluid exit port at substantially the same angle as its corresponding peripheral fluid exit port; and
integrally connecting said P flow selector bars with said front plate and with said rear plate, thereby fixing said front plate relative to said rear plate and defining P inter-bar flow channels between rotationally-adjacent pairs of said flow selector bars, such that said selector cylinder is seated over and freely and continuously rotatable around said flow selector bars and relative to said front and rear plates.

16. The method of claim 15, wherein:
when said selector cylinder is rotated to a central exit configuration such that said peripheral flow channel is substantially aligned with one of said inter-bar flow channels and consequently is in fluidic communication with said central fluid exit port, fluid introduced via said fluid entry ports of said front plate will emit through said central fluid exit port;
when said selector cylinder is rotated to a peripheral exit configuration such that said peripheral flow channel is substantially aligned with a given one of said peripheral fluid exit ports and is blocked from fluidic communication with said central fluid exit port by the corresponding flow selector bar, fluid introduced via said fluid entry ports of said front plate will emit through said given one of said peripheral fluid exit ports; and
when said selector cylinder is rotated to a mixed, two-port exit configuration such that said peripheral flow channel is partially aligned with said one of said inter-bar flow channels and in remaining part aligned with a given one of said peripheral fluid exit ports, fluid introduced via said fluid entry ports of said front plate will emit partially through said central fluid exit port and in remaining part through said given one of said peripheral fluid exit ports.

17. A method for routing the emission of fluid using a rotary flow valve, said method comprising:
introducing fluid into said rotary flow valve via a plurality of fluid entry ports of said rotary flow valve;
emitting the fluid through a central fluid exit port of said rotary flow valve by rotating a selector cylinder of said rotary flow valve to a central exit configuration such that a peripheral flow channel of said selector cylinder is substantially aligned with one of P inter-bar flow channels defined between rotationally-adjacent pairs of P flow selector bars of said rotary flow valve and consequently is in fluidic communication with a central fluid exit port of said rotary flow valve, where P is greater than or equal to 1;
emitting the fluid through a given one of P peripheral fluid exit ports of said rotary flow valve by rotating said selector cylinder to a peripheral exit configuration such that said peripheral flow channel is substantially aligned with said given one of said peripheral fluid exit ports and is blocked from fluidic communication with said central fluid exit port by the corresponding flow selector bar; and
emitting the fluid partially through said central fluid exit port and in remaining part through said given one of said peripheral fluid exit ports by rotating said selector cylinder to a mixed, two-port exit configuration such that said peripheral flow channel is partially aligned with said one of said inter-bar flow channels and in remaining part aligned with a given one of said peripheral fluid exit ports.

18. The method of claim 17:
said plurality of fluid entry ports running through a front plate of said rotary flow valve;
said central fluid exit port running through a substantial center of a rear plate of said rotary flow valve and said P peripheral fluid exit ports running through a substantially circumferential periphery of said rotary flow valve,
said P flow selector bars integrally connecting said front plate with said rear plate and fixing said front plate relative to said rear plate, each of said P flow selector bars corresponding on a one-to-one basis with one of said P peripheral fluid exit ports and angularly positioned relative to said central fluid exit port at substantially the same angle as its corresponding peripheral fluid exit port;
said selector cylinder comprising a solid cylinder body, a central flow channel running therethrough, said peripheral flow channel running therethrough, and a flow channel neck running therethrough, said flow channel neck providing unimpeded fluidic communication between said peripheral flow channel and said central flow channel; and
said selector cylinder seated over and freely and continuously rotatable around said flow selector bars and relative to said front and rear plates.

19. The method claim 17, wherein said P is greater than or equal to 2 and said P is less than or equal to 12.

20. The method claim 17, further comprising rotating said selector cylinder solely by physical actuation against an exterior surface of said selector cylinder.

21. The method claim 17, further comprising:
when fluid is introduced into said rotary flow valve at a substantially constant flow rate and pressure, said selector cylinder substantially offsetting any increase in flow through said peripheral exit ports by a decrease in flow through said central fluid exit port while conversely substantially offsetting any increase in flow through said central fluid exit port by a decrease in flow through said peripheral exit ports during said rotation; wherein:
even while rotating said selector cylinder from one rotational orientation to another rotational orientation, said rotary flow valve maintains the total flow rate of the fluid exiting from said central fluid exit port plus fluid exiting from said peripheral fluid exit ports to be substantially constant.

22. The method claim 17, further comprising further comprising pumping fluid under pressure into a fluid supply port of said rotary flow valve of at least 75 gallons per minute and of at least 75 psi, using high flow, high-pressure fluidic pumping device operationally-rated therefor.

23. The method claim 17, further comprising introducing fluid under pressure to said fluid entry ports using a fluid supply assembly configured to receive said fluid under pressure via a fluid supply port thereof.

24. The method claim 17, further comprising flowing fluid in a fluid reservoir through a continuous flow recirculation loop by:
connecting said central fluid exit port to said reservoir using a first flow conduit;
connecting said reservoir to a fluid supply port of said rotary flow valve using a second flow conduit; and
delivering fluid under pressure from said reservoir to a fluid supply port of said rotary flow valve, using a fluidic pumping device therefor.

25. The method claim 24, further comprising:
maintaining said fluidic pumping device in a state of substantially continuous operation;
as a default, keeping said rotary flow valve in said central exit configuration such that the fluid is continuously recirculating out of and back into said fluid reservoir while in this default configuration; and
only when it is desired to emit the fluid through said given one of P peripheral fluid exit ports, rotating said selector cylinder to said peripheral exit configuration or to said mixed, two-port exit configuration.

26. The method claim 24, said fluidic pumping device comprising a high flow, high-pressure fluidic pumping device pumping fluid under pressure into said fluid supply port of at least 75 gallons per minute and of at least 75 psi.

27. The method claim 24, further comprising fighting fire without human presence by connecting a fluid egress conduit from one of said peripheral fluid exit ports to deliver fluid output from said one of said peripheral fluid exit ports to a potential fire location.

28. The method claim 17, further comprising electronically controlling actuation of the rotation of said selector cylinder around said flow selector bars using a control module electronically programmed therefor, thereby electronically controlling the exiting of fluid among said central fluid exit port and said peripheral fluid exit ports according to said electronic programming.

29. The method claim 17, further comprising connecting a plurality of said rotary flow valves in series, such that the total number of peripheral fluid exit ports available from said rotary flow valves in series is equal to the sum of the number of peripheral fluid exit ports of a first rotary flow valve plus the number of peripheral fluid exit ports of a second rotary flow valve, comprising:
providing at least said first rotary flow valve and said second rotary flow valve;
connecting a central fluid exit port of said first rotary flow valve to a fluid supply port of said second rotary flow valve using a series flow conduit; and
flowing fluid in a fluid reservoir through a continuous flow recirculation loop by:
connecting a central fluid exit port of said second rotary flow valve to said reservoir using a first flow conduit;
connecting said reservoir to a fluid supply port of said first rotary flow valve using a second flow conduit; and
delivering fluid under pressure from said reservoir to said fluid supply port of said first rotary flow valve using a fluidic pumping device therefor.

* * * * *